(12) United States Patent
Sweeny et al.

(10) Patent No.: US 10,112,721 B2
(45) Date of Patent: Oct. 30, 2018

(54) PARACHUTE DEPLOYMENT SYSTEM FOR AN UNMANNED AERIAL VEHICLE

(71) Applicant: Flirtey Holdings, Inc., Reno, NV (US)

(72) Inventors: Matthew Sweeny, Reno, NV (US); Michel Fathallah, Sydney (AU); Tom Bass, Sydney (AU); Kranthi Baddam, Sydney (AU); John R. Foggia, Bristol, WI (US)

(73) Assignee: Flirtey Holdings, Inc., Reno, NV (US)

( * ) Notice: Subject to any disclaimer, the term of this patent is extended or adjusted under 35 U.S.C. 154(b) by 0 days.

(21) Appl. No.: 15/294,479

(22) Filed: Oct. 14, 2016

(65) Prior Publication Data

US 2017/0106986 A1    Apr. 20, 2017

Related U.S. Application Data

(60) Provisional application No. 62/241,572, filed on Oct. 14, 2015, provisional application No. 62/344,514, filed on Jun. 2, 2016.

(51) Int. Cl.
| | |
|---|---|
| *B64D 17/80* | (2006.01) |
| *B64C 25/58* | (2006.01) |
| *B64C 39/02* | (2006.01) |
| *G05D 1/00* | (2006.01) |
| *B64D 17/70* | (2006.01) |
| *B64D 45/00* | (2006.01) |

(52) U.S. Cl.
CPC .............. *B64D 17/80* (2013.01); *B64C 25/58* (2013.01); *B64C 39/024* (2013.01); *B64D 17/70* (2013.01); *B64D 45/00* (2013.01); *G05D 1/0038* (2013.01); *B64C 2201/108* (2013.01); *B64C 2201/146* (2013.01); *B64C 2201/185* (2013.01)

(58) Field of Classification Search
CPC ...................................................... B64D 17/80
See application file for complete search history.

(56) References Cited

U.S. PATENT DOCUMENTS

| | | | | |
|---|---|---|---|---|
| 6,416,019 | B1 * | 7/2002 | Hilliard | B64D 17/025 244/138 R |
| 6,471,160 | B2 * | 10/2002 | Grieser | B64D 17/80 244/138 R |
| 6,542,797 | B2 * | 4/2003 | Lohmiller | G05D 1/12 701/3 |
| 6,685,140 | B2 * | 2/2004 | Carroll | B64C 39/024 244/139 |

(Continued)

*Primary Examiner* — Adam D Tissot
*Assistant Examiner* — Alex C Dunn
(74) *Attorney, Agent, or Firm* — EIP US LLP

(57) ABSTRACT

Disclosed is a technique for landing a drone using a parachute. The technique includes a parachute deployment system (PDS) that can deploy a parachute installed in a drone and land the drone safely. The parachute may be deployed automatically, e.g., in response to a variety of failures such as a free fall, or manually from a base unit operated by a remote user. For example, the PDS can determine the failure of the drone based on data obtained from an accelerometer, a gyroscope, a magnetometer and a barometer of the drone and automatically deploy the parachute if any failure is determined. In another example, the remote user can "kill" the drone, that is, cut off the power supply to the drone and deploy the parachute by activating an onboard "kill" switch from the base unit.

48 Claims, 27 Drawing Sheets

(56) References Cited

U.S. PATENT DOCUMENTS

| | | | | |
|---|---|---|---|---|
| 7,467,762 | B1* | 12/2008 | Parsons | F42B 10/56 244/138 R |
| 8,483,891 | B2* | 7/2013 | Yakimenko | B64D 17/00 701/16 |
| 9,056,676 | B1* | 6/2015 | Wang | B64F 1/00 |
| 9,551,990 | B2* | 1/2017 | Heinonen | B64D 1/08 |
| 9,738,380 | B2* | 8/2017 | Claridge | B64C 19/00 |
| 9,740,208 | B2* | 8/2017 | Sugumaran | G05D 1/0219 |
| 9,874,874 | B2* | 1/2018 | Bernhardt | G05D 1/0055 |
| 2005/0006525 | A1* | 1/2005 | Byers | B64C 1/061 244/118.1 |
| 2011/0035149 | A1* | 2/2011 | McAndrew | G05D 1/0038 701/466 |
| 2013/0311009 | A1* | 11/2013 | McAndrew | G05D 1/0038 701/3 |
| 2015/0254988 | A1* | 9/2015 | Wang | G05D 1/0214 701/3 |
| 2015/0325064 | A1* | 11/2015 | Downey | G05D 1/0011 701/29.3 |
| 2016/0107751 | A1* | 4/2016 | D'Andrea | B64C 27/20 701/4 |
| 2016/0340049 | A1* | 11/2016 | Ferreyra | B64D 17/80 |
| 2016/0347462 | A1* | 12/2016 | Clark | B64D 17/62 |
| 2017/0021925 | A1* | 1/2017 | Weller | G06F 11/00 |
| 2017/0031365 | A1* | 2/2017 | Sugumaran | B64C 39/024 |
| 2017/0084181 | A1* | 3/2017 | Wilson | G08G 5/0069 |
| 2017/0225792 | A1* | 8/2017 | Wang | B64D 17/70 |
| 2017/0267347 | A1* | 9/2017 | Rinaldi | B64D 1/22 |

* cited by examiner

| INPUT STATES | | | "ON" CHANNELS |
|---|---|---|---|
| INHIBIT | B | A | |
| L | L | L | 0X, 0Y |
| L | L | H | 1X, 1Y |
| L | H | L | 2X, 2Y |
| L | H | H | 3X, 3Y |
| H | X | X | NONE |

X: DON'T CARE

*FIG. 9A*

PARACHUTE DEPLOYMENT SYSTEM FOR AN UNMANNED AERIAL VEHICLE

CROSS-REFERENCE TO RELATED APPLICATIONS

This application claims the benefit of U.S. Provisional Application No. 62/241,572, entitled "PARACHUTE DEPLOYMENT SYSTEM FOR AN UNMANNED AERIAL VEHICLE," filed on Oct. 14, 2015, and U.S. Provisional Application No. 62/344,514, entitled "PARACHUTE DEPLOYMENT SYSTEM FOR AN UNMANNED AERIAL VEHICLE," filed on Jun. 2, 2016, all of which are incorporated herein by reference in its entirety.

BACKGROUND

Unmanned aerial vehicles (UAV), such as drones, are autonomous and/or remotely operated unmanned vehicles. Drones may be configured to fly using fixed wings or helicopter rotors and blades. There are a wide variety of errors that can occur in operation of a drone. These include power loss, communication loss, mechanical breakage and circuit failure. Recovery from these errors includes detection of the errors and taking steps to mitigate further damage. Under safety regulations, the UAVs are required to minimize any potential damage or threat to the environment, especially whilst operating above households and places with human activity. Should an unexpected descent occur, the vehicle descends very fast and crashes. During such cases, descent velocity and trajectory are also uncontrolled. The UAV's rotor blades are exposed without protection and can potentially cause hazardous damage to the environment, e.g., nearby infrastructures and/or people.

Some UAVs use parachutes to minimize the descent velocity and rotor blade exposure during such unexpected events. However, the parachute deployment methods used in the current UAVs are not effective. The deployment methods require that the parachute be deployed manually, the power to the drone may not be cut-off and therefore, the drone rotors and blades may still be rotating, etc.

BRIEF DESCRIPTION OF THE DRAWINGS

FIG. 9A shows a logic table for the input states of the analogue multiplexers, consistent with various embodiments.

DETAILED DESCRIPTION

Figure 1A:
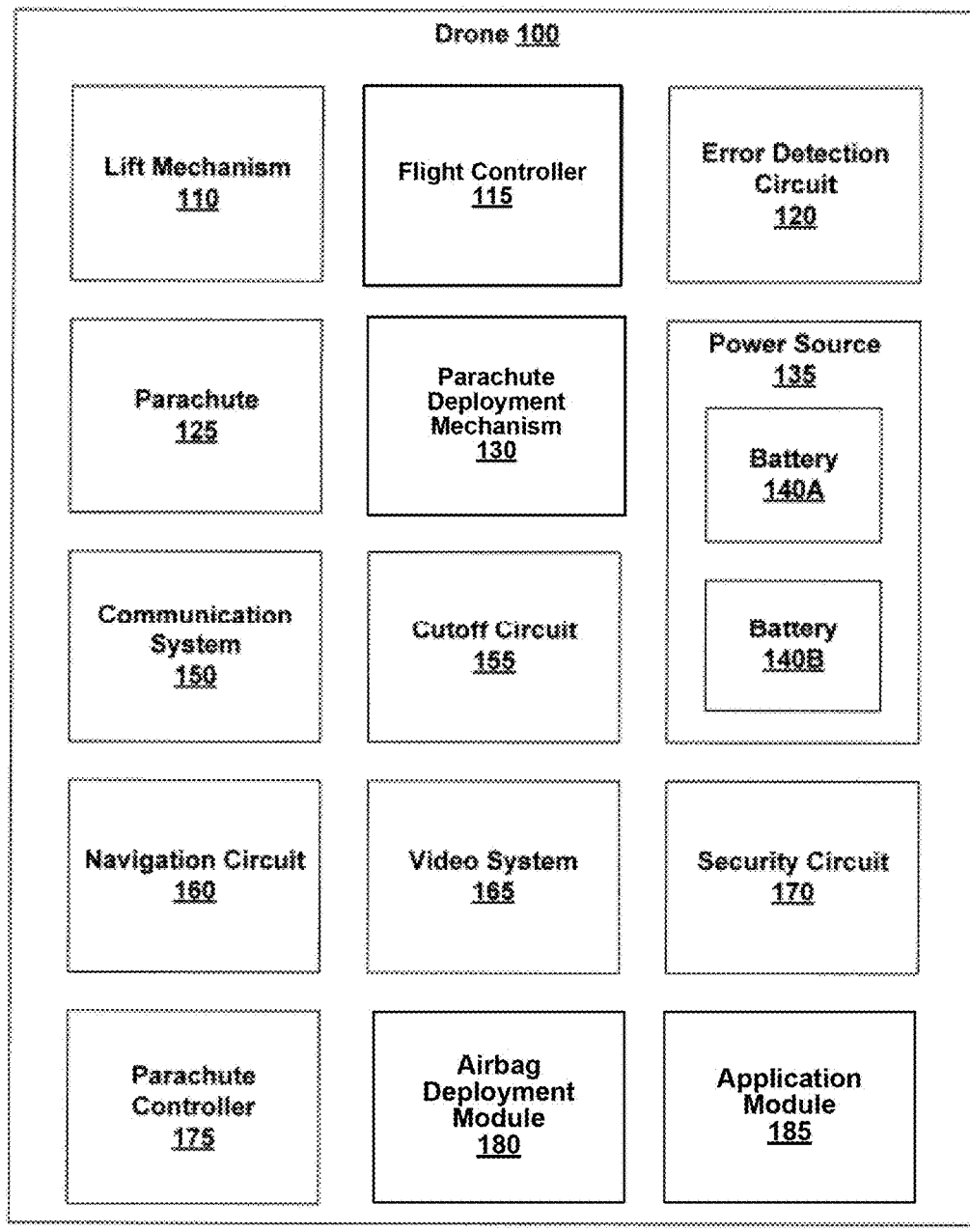
FIG. 1A is a block diagram illustrating components of a drone, consistent with various embodiments.

Disclosed is a technique for landing a UAV, such as a drone, using a parachute. The technique includes a parachute deployment system (PDS) that can deploy a parachute installed in a drone and land the drone safely. The parachute may be deployed automatically, e.g., in response to any of a number of errors/failures such as a free fall, or manually, e.g., from a base unit operated by a remote user. In some embodiments, the PDS can determine the failure of the drone based on any of (a) data obtained from an accelerometer, a gyroscope, a magnetometer and/or a barometer of the drone, (b) a geo fence breach, (c) a lack of heartbeat signal from an autopilot system (also referred to as a flight controller) which can indicate that the auto pilot system has ceased to function, and automatically deploy the parachute if any failure is determined. In some embodiments, the remote user can "kill" the drone by activating an onboard "kill" switch via the base unit. When the on board "kill" switch is activated, the "kill" switch kills the drone, that is, controls a lift mechanism of the drone, e.g., commanding motors of the drone to brake (e.g., commanding the motors to free spin, to actively brake, or substituting a throttle signal to the lift mechanism with a zero throttle command), and deploys the parachute. The base unit can be a hand held unit such as a remote controller that can perform radio communication with the drone or, in some embodiments, can be a part of the Ground Control Station software for the nominal operation of the drone itself or a fleet of drones. The ground control station can be software, hardware or a combination thereof that facilitates in operating the drone or a fleet of drones from a remote location.

In some embodiments, when the parachute is deployed, regardless of whether it is deployed automatically or manually, the PDS is configured to control the motors, e.g., stop rotor blades of the drone from rotating, thereby avoiding any damage that can be caused to the drone or the environment by the rotor blades which can still be rotating otherwise in the event of a failure. While the PDS can control the motors by sending a "BRAKE" signal to the motors, the PDS can also cut-off power supply to the drone, e.g., to a drivetrain of the drone, when or prior to the parachute is deployed. In some embodiments, while the power to drivetrain is cut-off the full functioning of the unaffected avionics is retained. The PDS can also cut-off the power supply from the drone's battery to the entire drone in a "master kill" mode. In some embodiments, the electrical connections that provide power supply to the motors can be cut-off to disable the motors permanently. Each of the above cut-off methods can be used in addition to or alternative to multiplexing the "BRAKE" signal to the motors for controlling the motors. In some embodiments, the PDS can use drone telemetry to activate the parachute instead of the separate telecommunications module.

The PDS has a number of other features. In some embodiments, the PDS operates independent of the drone. For example, the PDS can have its own power supply which is different from the power supply of the drone. In some embodiments, the PDS can be powered using the drone battery but can have a standalone battery as a backup. In another example, the PDS can have its own communications link which, when activated, shuts down the drone. The PDS can also facilitate steering the deployed parachute. The steerable parachute can have an integrated sensor system (e.g., visual, LIDAR, radar, laser, sonar) that facilitates autonomous decision making for avoiding obstacles and landing the drone at the least damaging location. The parachute can also be steered manually by a remote operator using the base unit. This sensor system may also act as a passive guidance aid to the remote operator who ultimately issues the commands in order to land the drone safely using the steerable parachute. The PDS can also support installing and deploying of multiple parachutes, e.g., for controlling the descent velocity more effectively. In some embodiments, the PDS uses different sized and shaped parachutes.

The PDS can activate the parachute using a variety of means. For example, the PDS can activate the parachute through a servo. In some embodiments, a servomotor is a rotary actuator or linear actuator that allows for precise control of angular or linear position, velocity and acceleration. The servomotor consists of a suitable motor coupled to a sensor for position feedback. The servo can be powered using an independent power source, e.g., the same as the one used to power the error detection circuit 120 or another independent power source. The servo can activate one or more shroud lines of the parachute 125. In another example, the PDS can use a carbon dioxide ($CO_2$) deployment system, a fuse ejection system or a magnetic release to deploy the parachute. The PDS can use a drogue parachute for quicker deployment.

FIG. 1 is a block diagram illustrating components of a drone 100, consistent with various embodiments. The drone 100 includes a lift mechanism 110 configured to lift and propel the drone. The lift mechanism 110 may include elements configured to provide thrust as well as lift. Examples of the lift mechanism 110 can include rotors of a rotorcraft, wings of fixed wing aircraft, lighter than air containers of aerostats (lighter-than-air aircrafts) and any hybrid combination thereof. The rotorcraft can utilize any number of rotor blades to provide lift and thrust throughout the duration of flight of the drone 100. Common examples of rotorcraft include helicopters which primarily use a single variable pitch rotor blade; and multi-rotors which use two or more typically fixed-pitch rotor blades to generate lift and thrust, and control attitude.

A fixed wing aircraft can generate lift through the wings based on the forward velocity of the aircraft, usually generated by thrust. The forward velocity can be generated using rockets, propellers and/or various types of jet engines. The flight control surfaces, often on the wings, allow changes in attitude. The forward thrust propulsion can be generated using propeller engines, jet engines, rocket engines, ramjet engines or any combination thereof. The methods of powering these engines can include carbon-based methods like petroleum or natural gas, electricity (generated on the go through solar panels or stored in batteries) and hydrogen cells.

The aerostats can rely on the use of a buoyant gas to generate lift. Common examples of aerostats include hot air balloons, which have uncontrolled attitude and forward thrust direction, and airships which utilize a propulsion engine to control forward thrust.

Hybrid combinations include the tilt wing and tiltrotor aircraft which change the tilt of the wing and the rotor respectively in order to allow the aircraft to use the same propulsion engines for vertical take-off and hovering as well as for forward thrust propulsion.

The drone 100 includes a flight controller 115 (also referred to as an auto pilot system) configured to control the drone 100 in flight. The flight controller 115 can be directly responsible for controlling all the mechanisms of flight and/or components of the drone 100 based either on input from a pilot over a remote connection, or from integrated onboard circuitry designed to autonomously control the drone. The flight controller 115 can have direct control over the lift mechanism 110 (e.g., thrust, tilt) and any flight control surfaces. The flight controller 115 can control the lift mechanism 110 for taking off the drone 100, flying the drone 100, and/or landing the drone 100. The flight control 115 can control the lift mechanism 110 in various ways, e.g., starting one or more motors of the lift mechanism 110, stopping one or more motors, increasing and/or decreasing the speed of rotation of one or more motors, and performing one or more of the above operations in a specified sequence or pattern among the one or more motors. In some embodiments, the flight controller 115 can be programmed, e.g., using onboard logic or circuitry, with some restrictions for the flight of the drone 100. For example, the flight controller 115 can be programmed to keep the drone 100 within a specified altitude, e.g., 400 feet. In another example, the flight controller 115 can be programmed to keep the drone 100 within a specified perimeter.

The drone 100 includes an error detection circuit 120 configured to detect errors in operation of the drone 100 and generate a trigger event in response to the error detection. The various types of errors include navigation loss of the drone 100, communication loss with a ground control station, heartbeat loss—lack of heartbeat signal from the auto pilot system or a flight controller, power being below a specified threshold or power loss of one or more power sources, impact of the drone 100, gyro error, motor control, geo-fence breach, loss in altitude, sudden drop, inversion, fire, video loss, tilt, etc. In some embodiments, the error detection circuit 120 is configured to receive a heartbeat signal from the auto pilot system or the flight controller, which indicates that the auto pilot system is functioning as expected, at predefined intervals. If the error detection circuit 120 does not receive the heartbeat signal at the predefined intervals, the error detection circuit 120 can determine that there is an heartbeat loss, which indicates a problem with the auto pilot system. In some embodiments, the error detection circuit 120 can determine an error due to an impact on collision of the drone 100 with an object or a human being. Occurrence of one or more of these errors can result in a failure of the drone 100. The error detection circuit 120 can then generate a trigger event in response to the detection of the error, which in turn can cause the PDS 190 of FIG. 1B (described in additional detail at least with respect to FIG. 1B) to deploy the parachute 125 automatically. In some embodiments, the error detection circuit 120 can use one or more sensors on board the drone 100 or in the PDS 190 to determine an error. The error detection circuit 120 can analyze the data from these sensors and determine whether an error has occurred. Further, a user can specify the errors for which the parachute 125 is to be deployed, e.g., one or more of the above described errors.

The drone 100 includes a parachute 125 securely attached to the drone 100 and configured to slow the decent of the drone 100 when the parachute 125 is deployed. The parachutes can be of type A or type B (described below at least with reference to FIG. 8). They can be deployed using various means, e.g., ballistic means, using servo, using compressed gas, using $CO_2$ gas cylinder, pyrotechnics, or it can be a spring loaded parachute. The parachute 125 can also be a steerable parachute, which can be steered by a remote operator from a base unit, e.g., a hand-held remote control, or completely autonomously using onboard or remote logic. The parachute 125 can be of various sizes. A particular size can be selected as a function of the weight of the drone 100. The parachute 125 can be securely attached to the drone 100 by being permanently attached or removably attached to the drone 100.

The drone 100 includes a parachute deployment mechanism 130 configured to release/deploy the parachute 125, e.g., in response to the trigger event from the error detection circuit 120. The parachute deployment mechanism 130 can also be configured to be manually activated by a remote user using a base unit operated by the remote user. In some embodiments, the parachute deployment mechanism 130 can automatically release the parachute 125 in response to detection of errors, such as a tilt of the drone 100 exceeds a specified number of degrees from the horizontal, has exceeded the tilt for a specified duration, is above a minimum altitude, the drone 100 is falling at a speed that exceeds a user-defined value, and/or if the drone 100 has breached a hard global positioning system (GPS) defined geo-fence.

The drone 100 includes a power source 135 configured to power the drone 100, e.g., the lift mechanism 110 and the error detection circuit 120. The power source 135 can include multiple power sources, e.g., a first power storage device 140a for providing power to the lift mechanism 110 and an independent second power storage device 140b for providing power to the error detection circuit 120. While the second power storage device 140b can power the parachute deployment mechanism 130 as well, in some embodiments, the parachute deployment mechanism 130 can also have an independent power source.

The drone 100 includes a communication system 150 that can facilitate a remote user to communicate with the drone 100, e.g., for steering the drone 100, for issuing any other commands to the drone 100 or receiving information from the drone 100. In some embodiments, the remote user can communicate with the drone 100 using a base unit, which can be a hand-held unit, that is capable of transmitting data to and receiving data from the drone 100, e.g., via radio or satellite communication. The communication system 150 can include a two-way radio to communication with the base unit 195 and/or ground control station. For example, the communication system 150 can communicate a status of the error detection circuit 120, e.g., details of detected errors, to the remote operator 105 at the base unit 195. In some embodiments, the communication system 150 provides diverse, redundant, and persistent communications for (a) command/control of the drone 100, and (b) communicating voice/data between the drone 100 and the base unit or ground control station. In some embodiments, the communication system 150 can include "aviation grade" communications for integration of UAVs within commercial environments and airspace.

The drone 100 includes a cut-off circuit 155 that can control the functioning of the lift mechanism 110 of the drone 100. For example, the cut-off circuit 155 can disable or stop the motors momentarily or permanently in response to detection of an error so that a parachute can be deployed automatically. The cut-off circuit 155 can include a "kill" switch, e.g., kill switch 193 of FIG. 1B, that is triggered when the error detection circuit 120 detects a failure of the drone 100. The "kill" switch controls the lift mechanism 110, e.g., disables or stops the motors momentarily or permanently. For example, the kill-switch can stop or disable the motors temporarily by braking the motors and/or cutting off the power supply to the motors causing the motors free spin, cutting off the power supply to motors by grounding the signal to the motors, by substituting the throttle signal from the flight controller to the lift mechanism 110, e.g., to the electronic speed controller (ESC) of the lift mechanism 110, with a zero throttle command from the PDS. In some embodiments, the lift mechanism 110 is controlled momentarily to allow the parachute 125 to be deployed. In another example, the kill switch 193 can stop or disable the motors permanently by cutting of the electrical connections to the motors. Other methods for disabling the lift mechanism 110 are also possible some of which are described below at least with reference to FIGS. 11-13.

In some embodiments, the failure of the drone 100 can be detected using the error detection circuit 120. In deploying the parachute 125, either the parachute 125 can be deployed first and then the motor be controlled, e.g., shut off, or the motor be controlled first and then the parachute 125 be deployed, or they can be done simultaneously. In some embodiments, the parachute 125 is automatically deployed when the motor is shutoff, e.g., the lift mechanism 110 is disabled. For example, the parachute deployment mechanism 130 can detect that the lift mechanism 110 is powered off and release the parachute 125 accordingly. In some embodiments, the lift mechanism 110 is controlled before the parachute 125 is deployed. Additional details with respect to controlling the lift mechanism 110 is described below.

The drone 100 includes a navigation circuit 160 that facilitates in the navigation of the drone 100. The navigation circuit 160 can have instructions such as a location where the drone 100 is to travel, etc.

The drone 100 includes a video system 165 that facilitates to capture an image, an audio clip, and/or a video clip of various targets from the drone 100. In some embodiments, the video system 165 can transmit the captured data to a remote user, e.g., in real time. In some embodiments, the video system 165 can store the captured data on a storage device installed in the drone 100 or store in a storage device at a remote location defined by the remote user. In some embodiments, the drone 100 includes a video camera installed on a downward facing gimbal for providing a video of the landing area to land the drone 100.

The drone 100 includes a security circuit 170 that facilitates in preventing unauthorized interference with the command and control of the drone and the PDS, such as hacking of the control datalinks between the drone and the base unit, e.g., Ground Control Station.

The drone 100 includes a parachute controller 175 that facilitates in steering the parachute 125 when the parachute 125 is deployed. The parachute can be steered automatically, or manually by an operator using the base unit. In some embodiments, the parachute controller 175 can steer the parachute 125 automatically using integrated sensors, e.g., video feed, sonar, radar, LIDAR, computer vision, infra-red, near infra-red (NIR), Thermal, sonic, of the drone 100 and/or the PDS, and using a logic system of the PDS that facilitates in avoiding obstacles and landing the drone at the safest available location or a specified location. For example, the parachute controller 175 can communicate with the video system 165 to monitor the environment around the drone 100 and facilitate in landing the drone at the safest available location in the event of the failure of the drone 100. These sensors may be a completely discrete system as part of the parachute controller 175 or it may make use of the suite of sensors that are still operable on the drone 100. In another example, the parachute 125 can be steered manually by an operator from the base unit, e.g., using a live video feed from the drone 100 or directly if the drone 100 is in a line of sight of the operator.

Steering the parachute 125 can be achieved in various ways. For example, the parachute 125 can steer itself using a set of servos or actuators, e.g., guided by a secondary auto pilot system linked to the PDS that is independent of the autopilot system of the drone 100, that lengthen and/or shorten control cables modifying the shape of the parachute 125 so as to effect pitch/roll/yaw control. In another example, one or more fans can be used to steer the parachute 125. In another example, pull cords of the parachute 125 can be used to steer the parachute 125.

The drone 100 includes an airbag deployment module 180 that deploys an airbag so that a damage that can be caused to the drone 100 or the environment where the drone 100 lands is minimized. The airbag deployment module 180 can be implemented in a number of ways. In some embodiments, the airbag deployment module 180 includes a safety assembly having a pressurized gas tank (or a chemical which when activated creates a controlled chemical explosion which generates gas) and one or more inflatable airbags connected to the gas tank through valve one or more valves. The tank may be controlled by a sensor device or receive a command to cause inflation of the air bag. The airbag deployment module 180 can also include a pressurized gas tank (or a chemical which when activated creates a controlled chemical explosion which generates gas) mounted on the drone 100. The airbag deployment module 180 includes one or more valves connected on one side of the pressurized gas tank at appropriate locations, and each valve is connected at its other side to at least one associated inflatable airbag. When the pressurized gas tank is filled with a gas at an appropriate pressure (or when the chemical is activated to create a controlled chemical explosion which generates gas) any sensor which may detect a forthcoming impact or receive a command which may be sent by a computer onboard the drone 100 or off board the drone 100, which causes the valve to open with the result of an instantaneous inflation of the air bags, due to the high gas pressure within the tank. The airbags can deploy at the exterior of the drone 100 causing a cushion against any impact with persons or property. In some embodiments, the above techniques can also be used to inflate the parachute 125.

The drone 100 can be deployed to perform one or more applications, e.g., surveillance of illegal activities to safeguard civil security, anti-poacher operations, forest fire fighting, monitoring flooding storms & hurricanes, traffic monitoring, radiation measurement, searching for missing persons, monitoring harvesting. The drone 100 can include an application module 185 that facilitates the drone 100 in performing a specified user-defined application. The application module 185 can include the instructions for the drone 100 to perform the specified user-defined application.

Note that the drone 100 illustrated in FIG. 1 is not restricted to having the above modules. The drone 100 can include lesser number of modules, e.g., functionalities of two modules can be combined into one module. The drone 100 can also include more number of modules, e.g., functionalities performed by a single module can be performed by more than one module, or there can be additional modules that perform other functionalities. Further, the functionality performed by a module described above can be performed by one or more of the other modules as well.

Figure 1B:
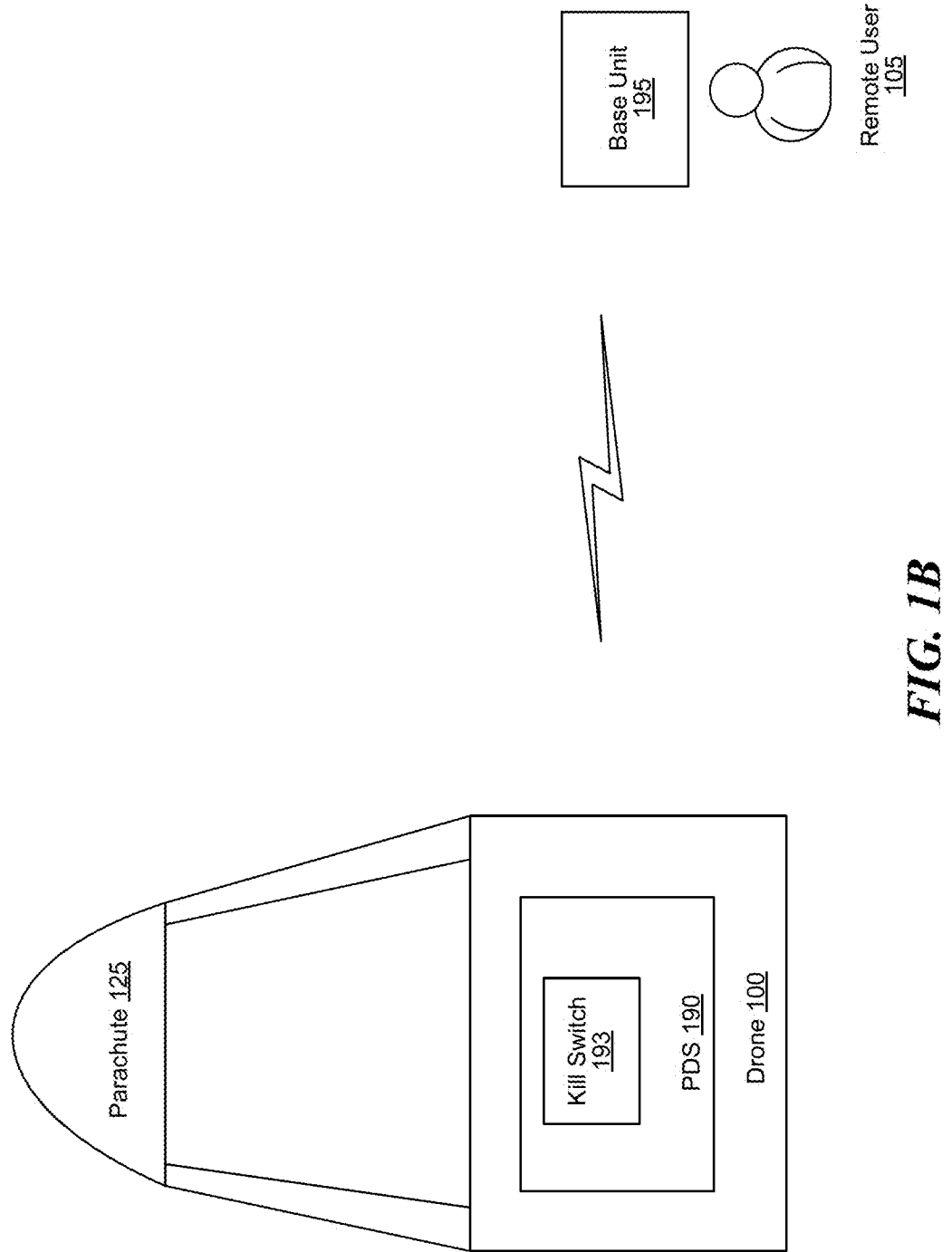
FIG. 1B is a block diagram of the drone with a parachute deployed, consistent with various embodiments.

FIG. 1B is a block diagram of the drone 100 with a parachute 125 deployed, consistent with various embodiments. The drone 100 includes the PDS 190 that facilitates deploying the parachute 125. The PDS 190 can deploy the parachute 125 automatically, or in response to a command issued by a remote operator 105 via a base unit 195. In some embodiments, the PDS 190 includes a "kill" switch 193 that, when triggered, controls the lift mechanism 110, e.g., brakes the motors and/or cuts off the power supply to the motors, and indicates the parachute deployment mechanism 130 to deploy the parachute 125. The kill switch 193 can be powered using an independent power source. The kill switch 193 can be activated by the remote operator 145 via the base unit 195. In some embodiments, the base unit 195 can send the command to the kill switch 193 over an encrypted communications channel. Note that the PDS 190 can be a combination of one or more modules/circuits/components of the drone 100 illustrated in FIG. 1, or can include additional modules, all of which together facilitate deployment of the parachute 125.

Figure 1C:
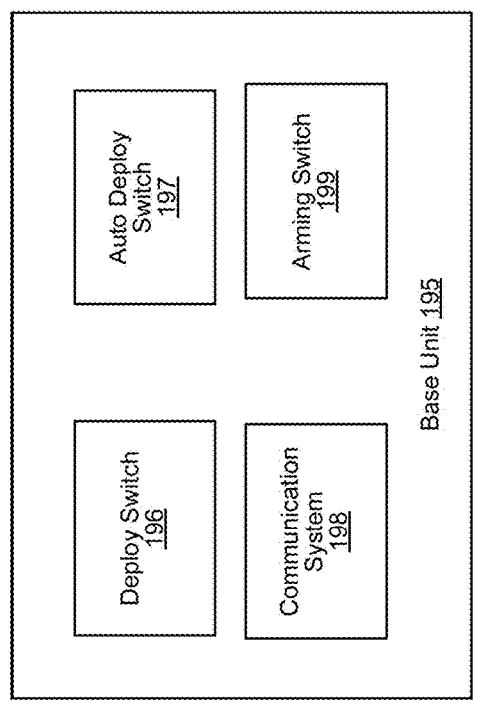
FIG. 1C is a block diagram of a base unit of FIG. 2, consistent with various embodiments.
Figure 2:
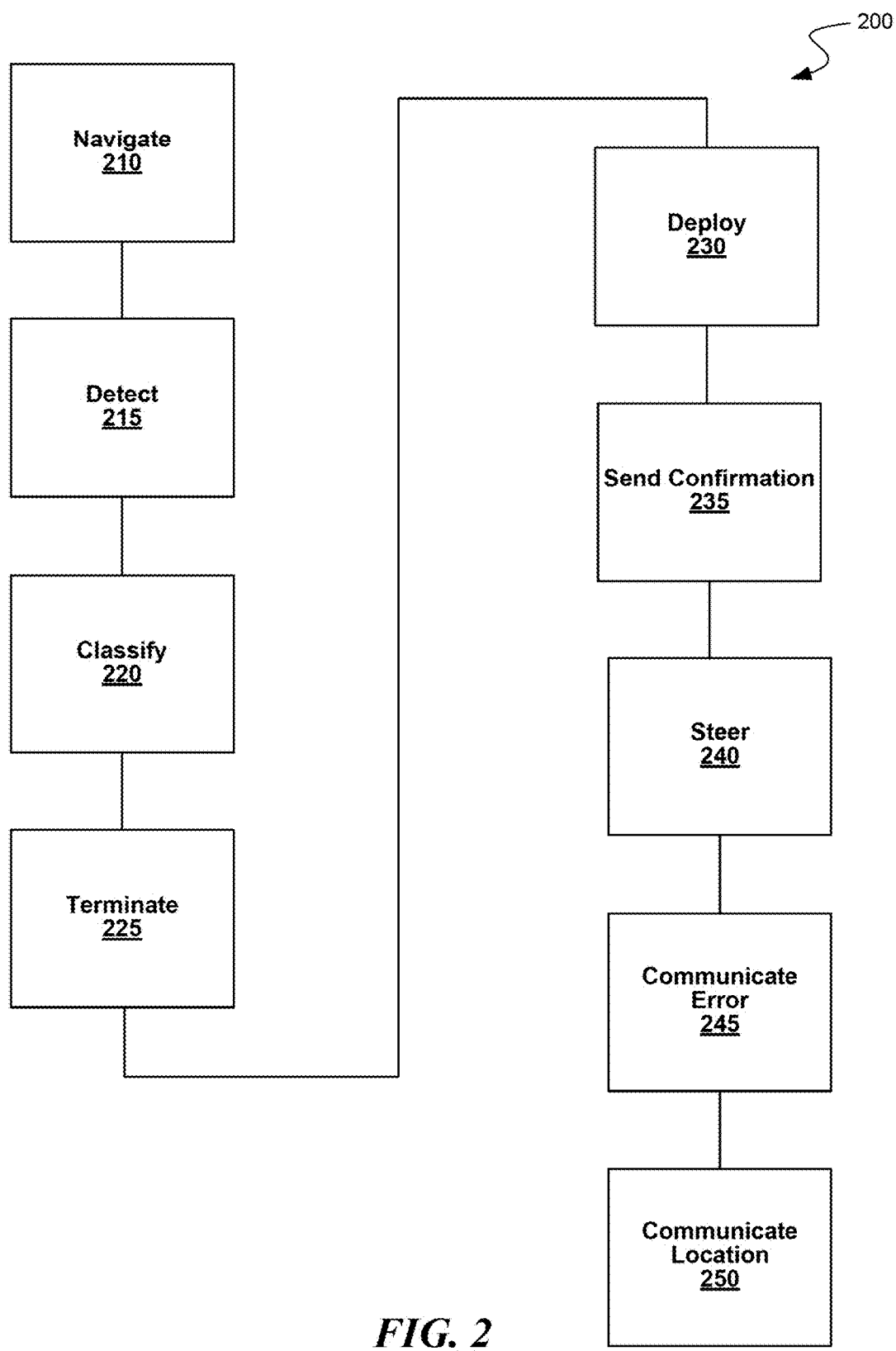
FIG. 2 is a flow diagram of a process for deploying a parachute in the event of a failure of a drone, consistent with various embodiments.

FIG. 1C is a block diagram of the base unit of FIG. 2, consistent with various embodiments. As described above, the base unit 195 can be a hand held unit such as a remote controller that can perform radio communication with the drone. In some embodiments, the base unit can be a part of the ground control station software. The base unit 195 is capable of performing radio and/or satellite communications with the drone 100. The base unit 195 can include a deploy switch 196, e.g., a push-button, that can send a signal to the onboard "kill" switch 193 on the drone 100 that, when activated, causes the drone 100 to deploy the parachute 125. The base unit 195 can include an auto deployment switch 197, e.g., DIP switch, for enabling or disabling auto deployment of the parachute 125 on the drone 100 in response to a failure of the drone 100. The base unit 195 can include a communications system 198, e.g., Xbee 900HP, for sending and receiving instructions from the drone 100. The base unit 195 can include an arming switch 199, e.g., flip switch, for enabling or disabling manual deployment of the parachute 125 from the base unit 195.

FIG. 2 is a flow diagram of a process 200 for deploying a parachute of a drone of FIG. 1, consistent with various embodiments. The process 200 can be performed using the drone 100 of FIG. 1. At block 210, the navigation circuit 160 facilitates in navigating the drone 100 to one or more locations. In some embodiments, the navigation circuit 160 receives the instructions for navigating the drone 100 from a base unit operated by a remote user, which is capable of performing radio and/or satellite communications with the drone 100.

At block 215, the error detection circuit 120 detects an error. For example, the error can be navigation loss, communication loss, power loss, impact, gyro error, motor control, sudden drop, inversion, fire, video loss, heartbeat loss, lack of electrical signal from error detection circuit, affirmative release of parachute electrical signal, the drone 100 exceeds a specified number of degrees from the horizontal, has exceeded the tilt for a specified duration, is above a minimum altitude, is falling at a speed that exceeds a user-defined value, and/or if it has breached a hard GPS defined geo-fence.

At block 220, the error detection circuit 120 classifies the error into a particular error type. In some embodiments, the parachute 125 is automatically deployed only if the error is of one or more specified types. The error types to which the parachute 125 is to be deployed can be specified by the user, e.g., as described above. For example, the heartbeat loss or the geo fence breach are some of the error types to which the parachute 125 is to be deployed.

In an event the error is classified into one of the specified error types, at block 225, the error detection circuit 120 generates a trigger event instructing the cut-off circuit 155 to control the lift mechanism 110. In some embodiments, the cut-off circuit 155 controls the lift mechanism 110 by disabling the lift mechanism 110 as described above.

In some embodiments, prior to controlling the lift mechanism 110, the error detection circuit 120 determines whether it is safe to deploy the parachute 125 based on safe deployment parameters such as minimum altitude to deploy the parachute 125. If the safe deployment parameters are not met, the parachute 125 is not deployed and therefore, the lift mechanism 110 is not disabled. The checking against the safe deployment parameters may be overridden by the remote operator 105 manually via the base unit 195.

At block 230, the parachute deployment mechanism 130 deploys the parachute 125 automatically, e.g., upon detecting that the lift mechanism 110 is controlled. Note that the steps of blocks 225 and 230 can be performed in any order or in parallel.

At block 235, the communication system 150 can send a signal back to the base unit 195 confirming the deployment of the parachute 125. In some embodiments, the warning lights or audible signals onboard the drone 100 linked to the PDS 190 can also be activated.

At block 240, the parachute controller 175 facilitates steering the parachute 125 to land the drone 100 at the least damaging location, e.g., at the safest available location. The parachute 125 can be steered manually by the remote operator 105 from the base unit 195, e.g., guided by the onboard video feed, or can be steered automatically towards the safest landing point as described above. For example, the PDS 190 uses either its own discrete set of onboard sensors, e.g., as described above, or requests the same from the sensors that are normally used by the drone 100 for situation awareness purposes to first identify all clear landing areas within the drone's current projected glide path, taking into account prevailing wind, other atmospheric conditions as well as the mass and velocities of the aircraft at the time of deployment. These landing areas can be identified according to a set of predefined parameters, e.g., a size of obstructions, lack of obstructions along the glide path as well as a level surface and a minimum distance from identified manned activities on the ground such as crowds, children, animals. These may then be ranked by the logic on the PDS 190, e.g., in a risk matrix driven process, that produces the safest eligible landing point that has a high confidence of attaining under the prevailing conditions. In some embodiments, the remote operator 105 monitoring the drone 100 will have full override capabilities as a final check in the system and will be presented visually with the same set of choices and can instruct an alternate if necessary. The PDS 190 then steers the drone 100 by manipulating the control lines to the parachute 125 toward the desired landing spot.

At block 245, the communication system 150 can communicate the details of the error to the remote operator 105, e.g., at the base unit 195 operated by the remote operator 105 or any other device that is capable of communicating with the drone 100. In some embodiments, the process described with reference to block 245 can be performed prior to the block 230.

At block 250, the communication system 150 can communicate the location where the drone 100 landed to the remote operator 105, e.g., at the base unit 195 operated by the remote operator 105 or any other device that is capable of communicating with the drone 100.

In some embodiments, if the parachute 125 is deployed automatically, e.g., when the remote operator 105 activates the onboard "kill" switch 193 using the base unit 195, then the process described with reference to blocks 225-250 may be performed.

Those skilled in the art will appreciate that the logic illustrated in the flow diagram discussed above, may be altered in various ways. For example, the order of the logic may be rearranged, substeps may be performed in parallel, illustrated logic may be omitted; other logic may be included, etc. In some embodiments, the steps of 215 and 220 may not be performed, e.g., when the user manually kills the drone 100, that is, cuts-off the power supply to the drone 100 and deploys the parachute 125 by activating the onboard kill switch from the base unit.

The disclosed embodiments include two components—the PDS and a rotor protection shroud (RPS) each of which are discussed in detail in the following paragraphs.

Parachute Deployment System (PDS)

The PDS 190 can be a combination of one or more modules of the drone 100 illustrated in FIG. 1. In case of a system failure in the drone 100, the drone 100 needs to be able to land as safely as possible. The PDS 190 deploys a parachute 125 that can safely land the drone 100. In some embodiments, the PDS 190 is configured to:

1. support no less than a specified weight, e.g., 4 kg, with a specified maximum rate of descent, e.g., approximately 4 m/s;
2. be completely self-powered;
3. be manually triggered remotely;
4. cut-off power supply to the drone 100; and
5. automatically detect failure.

In some embodiments, the PDS 190 is configured to include communications for manual activation, microcontroller for logic, parachute 125, power, and an Inertial Measurement Unit (IMU) (needed for automatic deployment). In some embodiments, each of these is fairly modular, and can be replaced with a similar system (e.g., a PDS using an XBee for communications can be replaced with any other Arduino-compatible telecommunication system).

In some embodiments, the PDS 190 and the RPS are integrated to the drone 100 considering the amount of weight added, and the mass and inertial balance of the vehicle, and the perturbation of aerodynamic effects the PDS 190 and the RPS introduce. The embodiments also minimize changes to the aerodynamic behavior of the drone 100 compared to the aerodynamic behavior without the PDS 190 and the RPS.

Automatic Failure Detection

The PDS 190 is configured to be able to automatically detect a failure, cutoff the drone power circuitry and deploy the parachute 125. In some embodiments, the automatic detection of failure will trigger when the drone 100:

- exceeds a specified amount of tilt, e.g., 25 degrees, from the horizontal;
- has exceeded the specified amount of tilt for a specified period, e.g., 2 seconds;
- is above a specified minimum altitude; and
- is falling at a specified speed, e.g., 5 m/s.

After the failure is detected, the PDS 190 can deploy the parachute 125, and send a signal to disable the motors, e.g., of the lift mechanism 110. In some embodiments, the signal to disable the motors can be sent first and then the parachute 125 can be deployed. However, various configurations of deployment are possible. Further, the failure can be triggered by various other factors.

The above triggering conditions stem from several factors, and are determined to be the characteristics of the drone under abnormal behavior. Under normal operations, the drone 100 can always be oriented as horizontally as possible—ideally zero. The necessary pitch and roll tilts that may be required to navigate the drone 100 is usually a specified range, e.g., below 10 degrees and not exceeding 25 degrees. Hence, it may be deemed that failure has occurred if the tilt is outside of the specified range. Nevertheless, due to the noise of the sensor reading, it can be dangerous to claim a failure, deploy the parachute 125, and shut off the motors whenever a tilt greater than 25 degrees is detected—it may simply be due to a noisy spike in the IMU sensor data signal. The tilt may also be caused by a short momentary disturbance of air flow, which may disturb the balance of the drone for a few milliseconds, but would calm before the drone loses its control. Hence, in some embodiments, it is deemed that a tilt should be monitored for a specified duration, e.g., 2 seconds. The PDS 190 can determine that a tilt of more than 25 degrees on duration of more than 2 seconds signals a high probability of system imbalance and failure, and therefore deploy the parachute 125 and shut off the motor automatically. This specified duration can be user specified and be easily changed by the user.

In some embodiments, the minimum altitude for deploying the parachute 125 can be determined based on local regulatory authorities. The specified speed at which the drone 100 is falling is also determined to be an indicator of system failure, and is typically greater than normal descend velocity, which is usually at a much milder rate.

Furthermore, one of the common points of failures can lie in a flight controller, e.g., Arducopter/Pixhawk controller. Not only will this will result in the motors actuating in an uncontrolled manner while the drone is falling, a more severe problem is that a flight controller failure implies the inability of the inbuilt PDS to be triggered correctly. As such, the failure detection system (e.g., error detection circuit 120) has to be self-powered and independent/modular. Therefore, the inbuilt PDS of the flight controller cannot be used. The power design of the failure detection system is further discussed in latter sections.

In some embodiments, the microcontroller used is the Arduino Uno or smaller versions of the Arduino like the Nano. In some embodiments, the microcontroller is built using a custom made printed circuit board (PCB), e.g., to minimize the weight and volume that the PDS 190 would take on a drone. The specifications of the Arduino Uno are:

TABLE 1

| Arduino Uno Specifications | |
|---|---|
| Microcontroller | ATmega328 |
| Operating Voltage | 5 V |
| Digital I/O Pins | 14 (of which 6 provide PWM output) |
| Analog Input Pins | 6 |
| Flash Memory | 32 KB |
| EEPROM | 1 KB |
| SRAM | 2 KB |
| Clock Speed | 16 MHz |

As the above ATmega328 microcontroller is used on the Arduino Uno for on board processing, it is of great advantage to use products compatible with Arduino such as the L3GD20H (3-axis gyroscope), LSM303 (3-axis compass and 3-axis accelerometer), in order to accomplish an AHRS (Attitude and Heading Reference System). These modules are greatly supported in the Arduino community, which simplifies the design and integration. In some embodiments, for automatic failure detection system, Adafruit's 10DOF IMU break-out board is used. The Adafruit's 10DOF IMU break-out board consists of the above modules (L3GD20H & LSM303) as well as a barometer (BMP180) for relative altitude measurements and has the necessary on-chip processing capabilities to lessen the computational load on the on-board computer.

Figure 3:
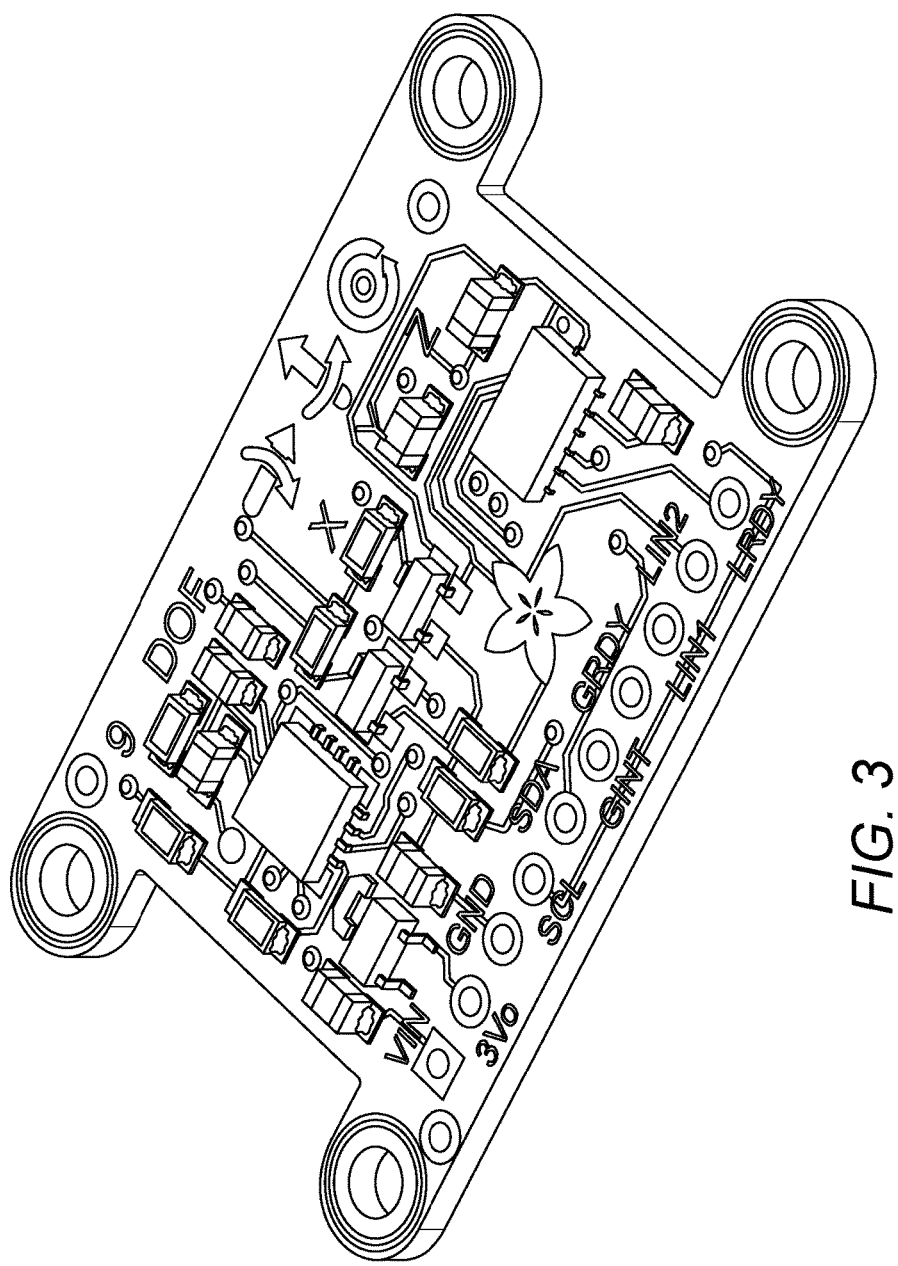
FIG. 3 is an example of an inertial measurement unit (IMU) used to build the attitude and heading reference system (AHRS), consistent with various embodiments.

The IMU module has 10 degrees of freedom, 3 each for accelerometer, compass (magnetometer) and gyroscope, and 1 for altitude. FIG. 3 is an example of an IMU used to build the AHRS, consistent with various embodiments. The IMU of FIG. 2 has high accuracy sensor readings and on-board processing capabilities.

The AHRS can be built from the 10DOF IMU in two ways. The first way is to utilise the gyroscope alone, to provide the three euler angles—roll, pitch, and yaw—after the angular rate sensor data is passed through a first order integration algorithm, in order to obtain the angular positions. However, the gyroscope can suffer from two main disadvantages—gyroscopic drift and gimbal locks. The gyroscopic drift is a phenomenon of a static or dynamic shift in estimated attitude readings. This can be caused by two reasons—the first being an inherent drift in the gyroscopic sensor, and the second being the result of integrating noisy signals over time. The gimbal locks disadvantage is a mathematical and physical one, where the euler angle measurements provided by the gyroscope suffers from the gimbal locks when the roll or pitch is ±90°. These issues can be resolved, however, with many advanced algorithms available from the IMU community.

Nevertheless, a second approach to build the AHRS can be to take advantage of the earth's magnetic field and gravitational field, in order to bypass resolving all the above problems with the gyroscope. On a hovering aircraft, a tilt in the roll and pitch direction will be registered as a change in experienced g-force by the accelerometer in the x and y direction respectively, which can be used to deduce the amount of tilt in each direction. The IMU can have this simple algorithm built in to the break out board, so that roll and pitch readings can be readily obtained from the accelerometer. Unlike the gyroscope, this is not a relative measurement, but an absolute one—the reading will register as zero if there is no tilt (the drone does not feel a stronger pull on either side of its body if it is horizontal), hence this method immediately removes the problem of drift. Note that the accelerometer cannot measure yaw, since the g-force experienced by the drone is invariant under yaw rotations.

To measure the yaw angular position, the on-board compass, or magnetometer, can be used to measure the direction of the earth's magnetic field. Provided that the drone does not fly across time zones and continents, the direction of the earth's magnetic is constant throughout the drone's journey and can be used as a reference to the drone's heading, or yaw, direction. Of course, this may require an initial knowledge of where the earth's magnetic field is pointing throughout an area of interest. This is a well-documented piece of information that can be looked up. Like the accelerometer, the magnetometer reading is absolute, and does not suffer. This reading can be accurate, unless a magnet is nearby—a phenomenon that may not usually expected in mid-air.

With this second approach, the AHRS will provide a more accurate, driftless reading for the drone. Note that, however, the attitude data is still represented by eular angles, so that gimbal locks are still present. Nevertheless, this may not be an issue, as long before the UAV would hit a tilt of ±90°, the PDS 190 would have deployed the parachute 125 and shut off the motors.

With the accelerometer and compass to serve as secondary sensors for attitude determination, this IMU can provide a low cost AHRS module. With this sensor reading, the above failure detection criteria can be implemented, e.g., in software.

A barometer can be used for determining the failure based on the third failure criterion—whether the drone 100 is above a specified minimum altitude. The PDS 190 would need to initialize the barometer to a set level and use relative measurements after that.

Figure 4:
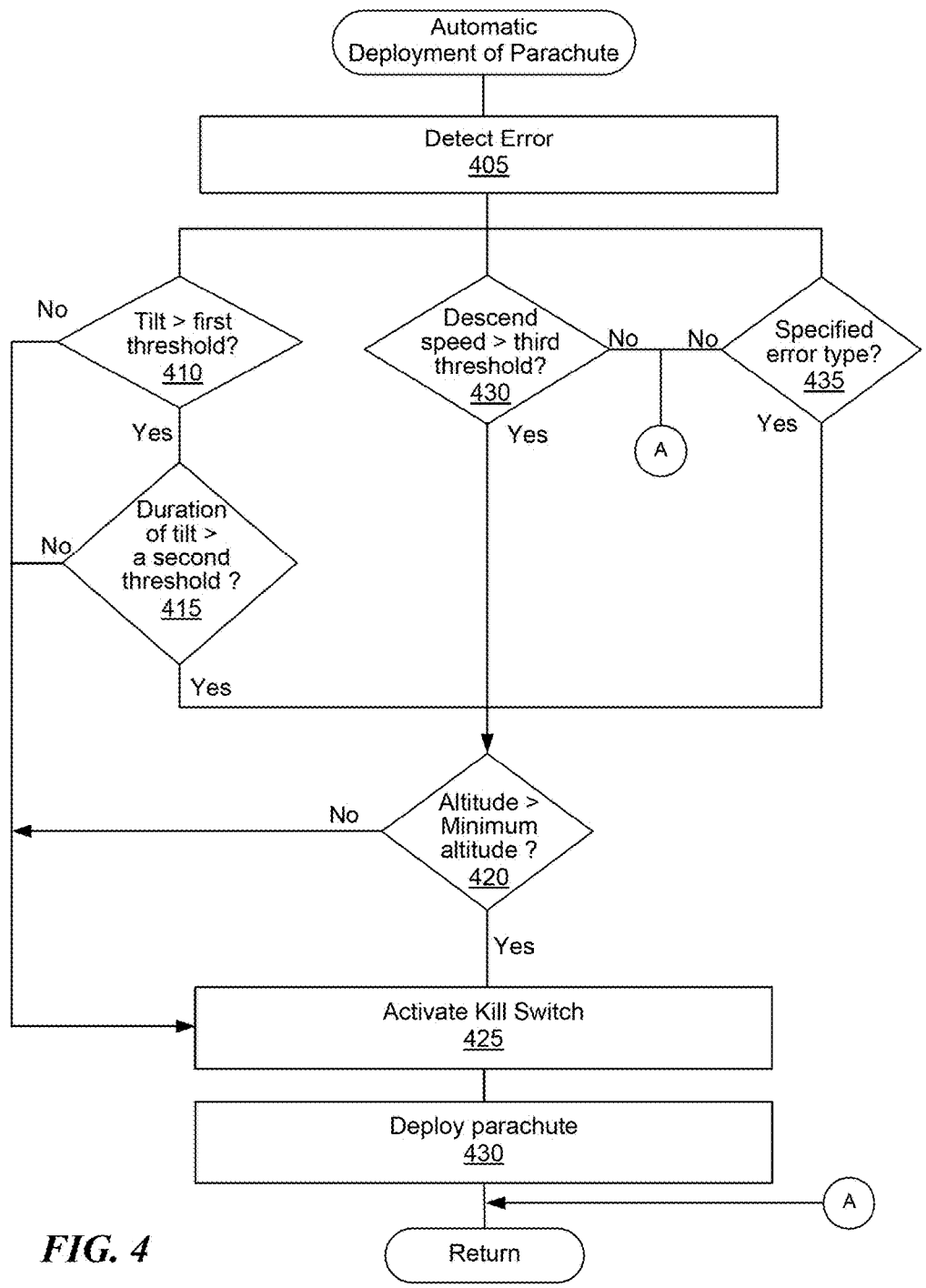
FIG. 4 is a flow diagram a process for deploying the parachute automatically, consistent with various embodiments.

FIG. 4 is a flow diagram a process 400 for deploying the parachute 125 automatically, consistent with various embodiments. The process 400 can be implemented using the drone 100. At block 405, the error detection circuit 120 detects an error. The error detection circuit 120 determines a type of the error. In some embodiments, the parachute 125 is automatically deployed only if the error is of specified types. The error types to which the parachute 125 is to be automatically deployed can be defined by a user.

At decision block 410, the error detection circuit 120 determines if the error is due to a tilt of the drone and if the tilt of the drone exceeds a first threshold, e.g., 25 degrees. If the tilt does not exceed the first threshold, the process 400 returns, that is, the parachute 125 is not deployed. On the other hand, if the tilt exceeds the first threshold, at decision block 415, the error detection circuit 120 determines if the duration of the tilt exceeds a second threshold, e.g., 2 seconds. In some embodiments, a short-duration event may not trigger release of the parachute (e.g., downdrafts, temporary loss of lift). If the duration of the tilt does not exceed the second threshold, the process 400 returns. On the other hand, if the duration of the tilt exceeds the second threshold, at decision block 420, the error detection circuit 120 determines if the altitude at which the drone 100 is flying exceeds a minimum altitude, e.g., 20 feet. If the drone 100 is flying below the minimum altitude to deploy a parachute, the process 400 returns. On the other hand, if the drone 100 is flying above the minimum altitude, at block 425, the on-board kill switch of the cut-off circuit 155 is activated. The on-board kill switch controls the lift mechanism 110, e.g., disables the motors of the lift mechanism 110 as described above. After the lift mechanism 110 is controlled, at block 430, the on-board kill switch notifies the parachute deployment mechanism 130 to deploy the parachute 125.

In some embodiments, the tilt includes an attitude of the drone 100, e.g., which is an orientation of the drone 100. The attitude of the drone 100 can be obtained using one or more sensors onboard the drone 100.

Referring back to block 405, if the error is a sudden decrease in the altitude, at decision block 430, the error detection circuit 120 determines whether the speed at which the drone 100 is descending exceeds a third threshold, e.g., 5 m/s. If the descend speed of the drone 100 does not exceed the third threshold, the process 400 returns. On the other hand, if the descend speed of the drone exceeds the third threshold, the process 400 proceeds to block 420 and determines whether to deploy the parachute 125 or not as described above.

Referring back to block 405, if the error is of other types, at decision block 435, the error detection circuit 120 determines if the error is of any of the specified types for which the parachute 125 is to be automatically deployed, e.g., navigation loss, communication loss, power loss, impact, gyro error, motor control, sudden drop, inversion, fire, video loss, heartbeat loss, geo fence breach, or lack of electrical signal from error detection circuit 120. If the error is not of the specified types for which the parachute 125 is to be automatically deployed, the process 400 returns. On the other hand, if the error is of the specified types for which the parachute 125 is to be automatically deployed, the process 400 proceeds to block 420 and determines whether to deploy the parachute 125 or not as described above.

Communications Methods

The PDS 190 has the capability to remotely and manually trigger the parachute 125 and shut down the drone 100. In some embodiments, the PDS 190 is configured to:
have the communications work within a reasonable range, e.g., the drone 100 is within sight of the operator; and
transmit back its state and confirm each input by the user.

In some embodiments, the radio transceivers used include a radio transceiver that provides a very convenient way of achieving full duplex wireless communication between the drone and a base unit operated by the operator. An example of the radio transceiver includes XBee-PRO 900HP (S3B). Although the XBees are technically half-duplex, they contain internal buffers that make them function as full duplex devices.

The radio transceiver can be made flexible in terms of its strength and data rate, through simple configurations. Once configured correctly, the radio transceiver simply receives, in the form of serial communications, signals from any radio source coming from the same type of radio transceiver, with the same type of configuration.

Figure 5B:
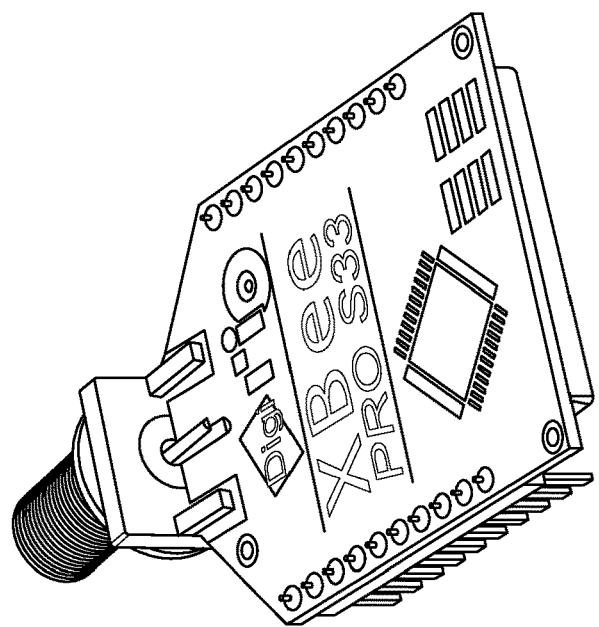
FIG. 5B shows an example of a communications subsystem having an XBee radio transceiver, consistent with various embodiments.
Figure 5A:
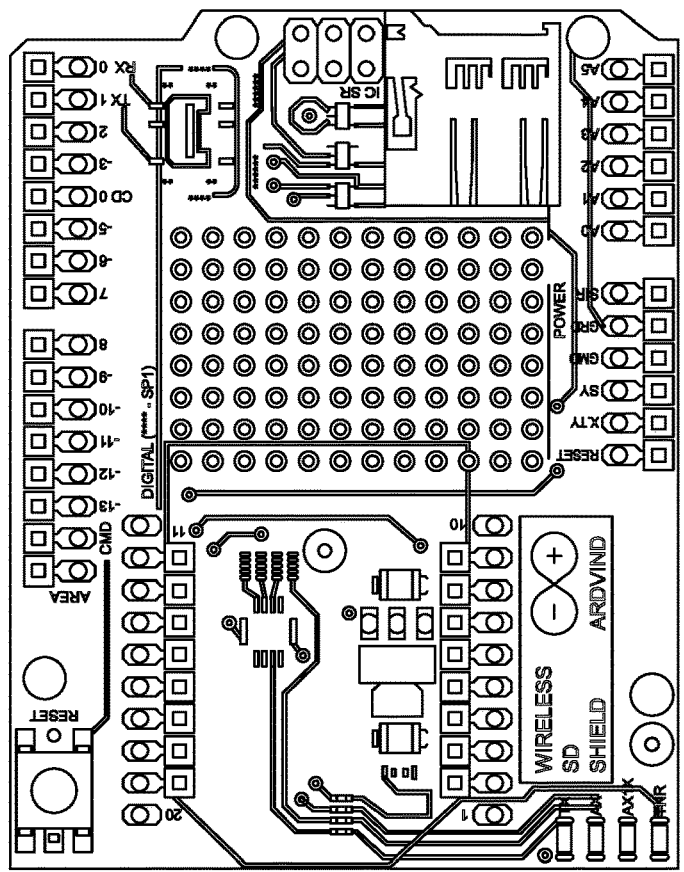
FIG. 5A shows an example of a communications subsystem having a wireless SD shield, consistent with various embodiments.

After the setup, on the on-board processor of the drone, one radio transceiver is simply mounted on a wireless SD shield, e.g., an Arduino Wireless SD Shield, while the other is connected through an USB adapter to a remote PC. The Wireless SD shield, shown in FIG. 5A, provides a wireless communication platform between the radio transceiver and the on-board computer (Arduino Uno) through an internal serial link. FIG. 5A shows an example of a communications subsystem having a wireless SD shield, consistent with various embodiments. FIG. 5B shows an example of a communications subsystem having an XBee radio transceiver, consistent with various embodiments. The wireless shield also offers a micro SD card slot, which allows the possibility of an extension involving an on-board logging of data. For example, sensor readings can be written to the on-board data logging module provided by the SD Shield at a higher frequency than it would transmit back to the ground station, for later analysis purposes.

The long-range radio transceivers operate at 9600 baud, although this is easily adjustable to suit higher data rate demands. In some embodiments, the radio transceiver module has transmission power of 250 MW. Its line of sight transmission range is very flexible—depending on the antenna size. With an optimal antenna, the radio transceiver can communicate at distances up to 45 km (Line of Sight). However, under more modest antenna sizes, the radio transceiver can communicate at specified distances, e.g., up to 14 km, if they are within light of sight towards each other. Under indoor conditions, however, the blockage may reduce that distance down to a specified maximum communicating distance, e.g., 600 m. Nevertheless, this can usually be easily avoided by having a large antenna on the ground end, located further from the ground such as the top of a building.

The radio transceiver communicates at an adjustable frequency, e.g., between 902 MHz to 928 MHz—so that it can be configured to avoid the common frequency for communications, e.g., 915 MHz. The bandwidth can be configured to be sufficiently small to avoid any interference. The data rate can also be configured to between a specified range, e.g., 10 Kbps or 200 Kbps.

The radio transceiver is a very economical way of achieving wireless communication, as it is greatly supported by the Arduino community, and it communicates in the form of Universal Asynchronous Receiver/Transmitter (UART) serial communications—meaning that minimal decoding and encoding needs to be done. This also allows the software design on the part of communications to be simple—it is simply a matter to handling serial data and serial transmission/reception, for which the Arduino already has in-built libraries and functionality.

In some embodiments, the PDS 190 also includes a graphical user interface (GUI) and a set of tele commands for automatic failure detection by the PDS 190. On a remote PC, the user can choose to continuously receive system state data, such as the roll, pitch, and yaw of the drone, or disable this option completely. The user can also verify and toggle the mode of the automatic detection failure—whether automatic deployment and shut off is enabled or not. In either case, the user may always have access to manually trigger the parachute deployment and motor shut off—through the press of a single button, e.g., "kill" switch, e.g., in case of emergency. The software is designed to be very scalable; the list of commands can be expanded very easily, so that extra functionality and commands can be built into the system in a straightforward manner if future scenarios require so.

An example list of commands of the automatic failure detection portion of the PDS 190 include:
h: help command—displays the following list of commands
c: check mode (automatic or manual, and is it deployed?)
a: set as automatic mode (shut off will be automatically triggered)
m: set as manual mode (shut off will not be automatically triggered)
t: toggle mode (between automatic and manual mode)
d: deploy parachute and shut off motor (if in manual mode—non-emergency)
s: screen data display toggle (whether or not to display IMU information)
z: emergency deploy and motor shut off (for immediate emergency use)

Power

In some embodiments, the PDS 190 is completely self-powered, that is, it can have an independent power supply and does not share the power supply of the drone 100. This can be essential in keeping the whole parachute deployment method as modular as possible. A separate power supply to the PDS 190 would ensure maximum reliability.

In some embodiments, the power subsystem of the PDS 190 is configured to:
1. sustain charge for at least a specified amount of time, e.g., one return flight, which can be 1 hour;
2. power the servo that controls the parachute; and
3. occupy minimal space.

For example, if the microcontroller used is the ATmega328, the microcontroller uses around 10 mA of current when it is operating. The built in efficiency $\eta \approx 0.9$ of the on-board voltage regulator is already included in the 10 mA of current draw. Since the Arduino is completely powered on, it will use approximately 36 mAh/h. If the radio transceiver is XBee (900HP), for example, it uses 230 mA of current to transmit and 45 mA to receive. The transmitter may be activated every 10 seconds and takes at most 0.1 seconds to transmit all the data. This translates to around 0.032 mAh per transmission. Receiving is always active and therefore uses 162 mAh/h. Combining the two power requirements, the power module therefore uses around 170 mAh/h. Some example power calculations of the power subsystem are summarized in table 2.

In some embodiments, since the servo is only powered for less than a second, it may draw less than 40 mA of current and therefore, the power requirements are negligible. The same can be assumed for the logic level multiplexers used to cut-off the signal to the motor controllers.

TABLE 2

Power Calculations

|  | Current | Time on/hour | Power Req./h |
|---|---|---|---|
| ATmega328 | 10 mAh | 3600 seconds | 36 mAh |
| XBee 900 HP TX | 230 mAh | 36 seconds | ~8 mAh |
| XBee 900 HP RX | 45 mAh | 3600 seconds | 162 mAh |
|  |  | Total | ≈206 mAh |

In some embodiments, any battery that has a capacity of around 200 mAh would power the entire safety delivery system for roughly an hour. In some embodiments, the chosen battery size is 2500 mAh. While the size and weight of the 2500 mAh Adafruit batteries are nearly double the 1200 mAh batteries, the factor of safety and convenience is worth carrying the extra volume and weight, at least for Mark I of the system. The volume is not much of an issue anyway because it can easily fit in the Arduino plastic box that came with the components. The example specifications of the battery are:

The output ranges from 4.2V when completely charged to 3.7V.
2500 mAh
Included protection circuitry keeps the battery voltage from going too high (over-charging) or low (over-use) which means that the battery will cut-out when completely dead at 3.0V.
Max 1200 mA charge rate (ideally 500 mA).
Genuine 2-pin JST-PH connector.
Weight=52 g
Size=51 mm×65 mm×8 mm The circuit also uses a voltage regulator to power the Arduino and other components. Since all other components (parachute servo, XBee, etc.) powered directly from the Arduino Uno board then there would be no need for an external regulator since the Arduino Uno already has an on-board regulator. It was, however, included such that there would be a voltage regulator for Mark II, where the ATmega328 chip would be removed from the Arduino and soldered directly onto a custom-made PCB. The voltage regulator would then power the Arduino itself and all peripheral components. In Mark II, it would also be recommended to switch to a Pololu regulator even though it is not entirely necessary, to regulate voltage both ways (buck boost). Because the batteries supply 3.7-4V during nominal operation, then there would only be a boost required (to take it up to 5V). Having only one switching voltage regulator in Mark II would then maximize the power efficiency ($\eta \approx 0.9$ instead of $\eta \approx 0.81$). The example specifications are:

2 A internal switch (2.5 A peak limiting) means one can get 500 mA+ from a 3.7V LiPoly/LiIon battery.
Low battery indicator LED lights up red when the voltage dips below 3.2V.
90%+ operating efficiency in most cases.
Weight=4 g
Size=22 mm×37 mm×2 mm Alternatively, the whole PDS 190 could be powered by a single 9V battery which depending on the manufacturer and the chemicals used gives around 500 mAh. That is around 2.5 hours of use. The advantage of this is that the boost converter from the batteries can be excluded and the onboard regulator on the Arduino Uno board can be used. The 9V battery may be plugged into the "VIN" terminal on the Uno board.

The battery charger can supply a steady current to the batteries. The example specifications of the battery charger are:

USB or DC power—5 to 12V input
Charges one single-cell 3.7/4.2v batteries
Three indicator LEDs—green for power, orange for charging and red for error
Charging LED will blink when the battery is full Note that the power to other circuitry like the multiplexers is minimal.

Figure 6A:
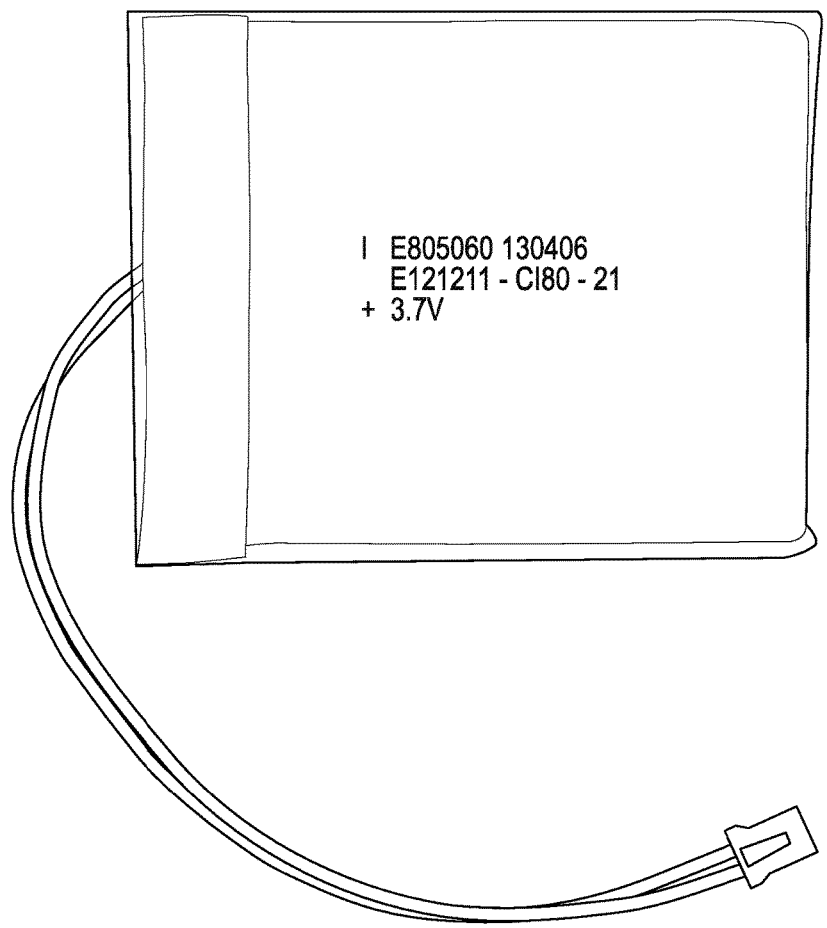
FIG. 6A shows an example of a 2500 mAh battery used in the drone, consistent with various embodiments.
Figure 6B:
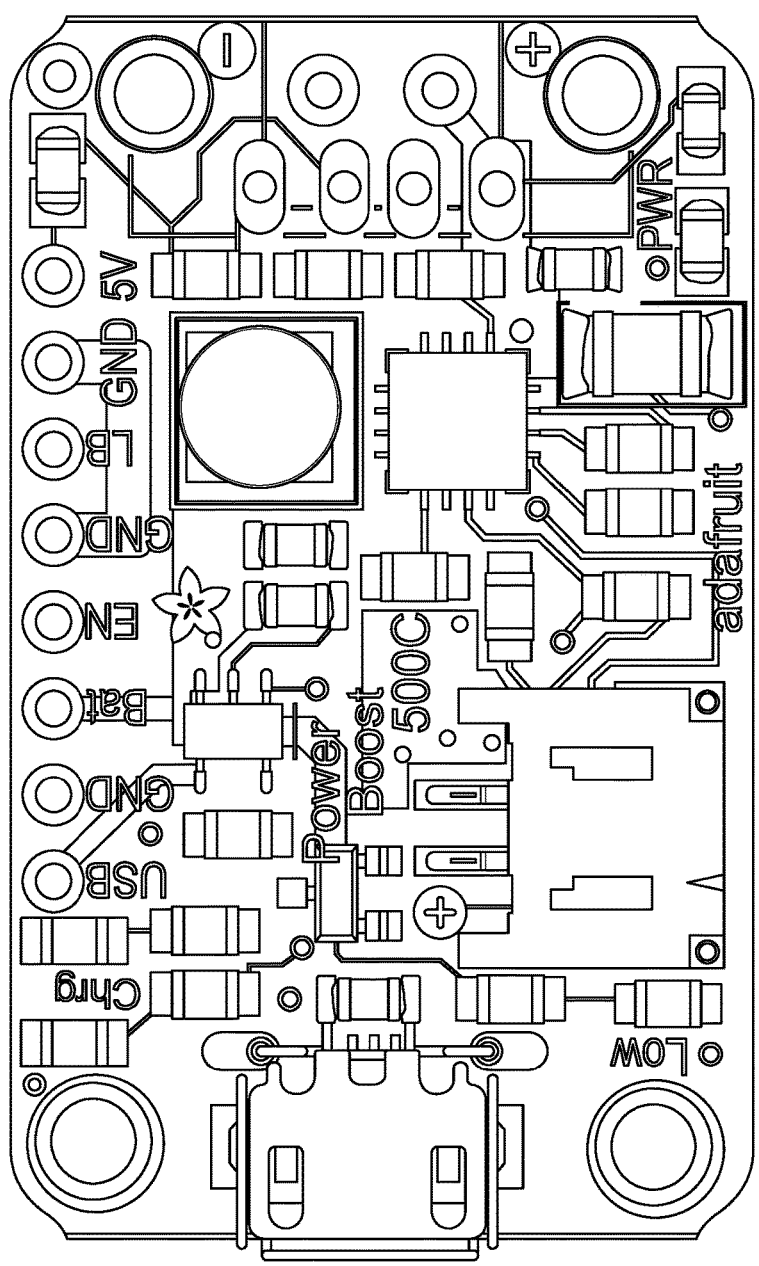
FIG. 6B shows an example of a voltage regulator used in the drone, consistent with various embodiments.
Figure 6C:
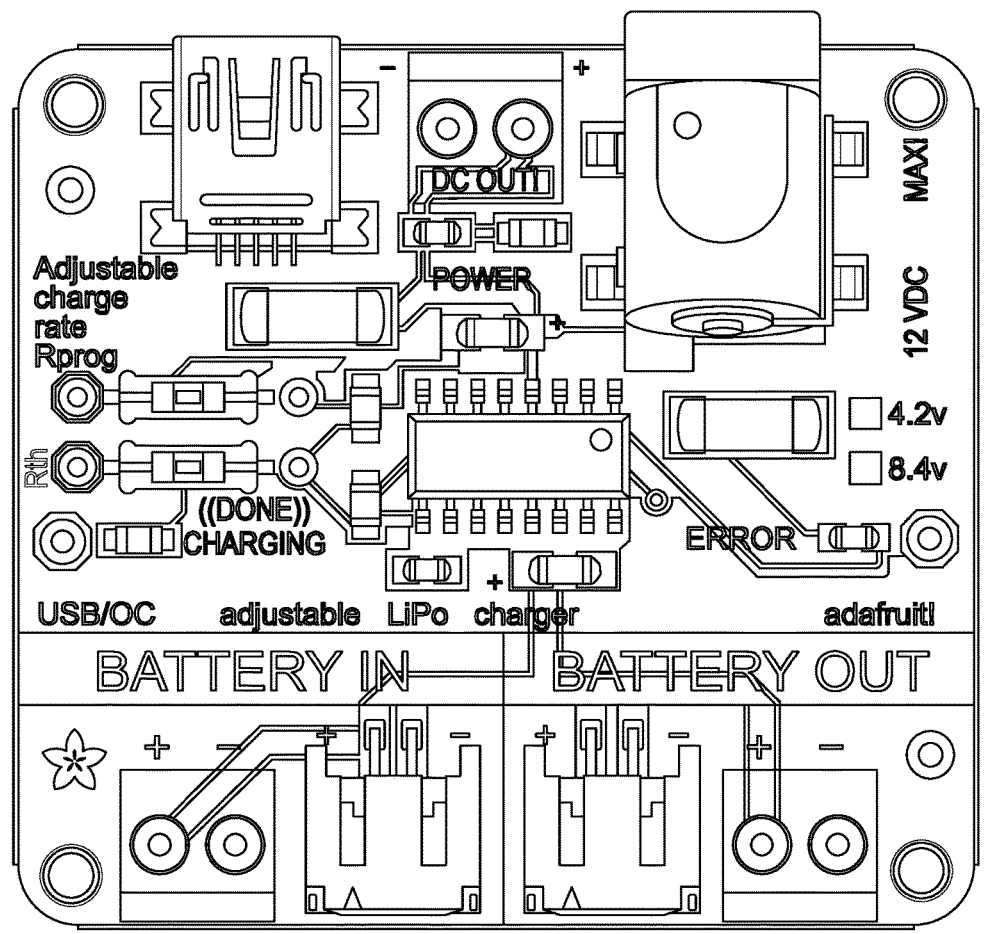
FIG. 6C shows an example of a battery charger used in the drone, consistent with various embodiments.

FIG. 6A shows an example of a 2500 mAh battery consistent with various embodiments. FIG. 6B shows an example of a voltage regulator, consistent with various embodiments. FIG. 6C shows an example of a battery charger, consistent with various embodiments.

In some embodiments, the power subsystem of the PDS 190 could be ameliorated in multiple ways:
1. A smaller buck boost from Pololu could be used. The Pololu voltage regulators are smaller but do not compromise on current, delivering up to 1 A.
2. If no custom-PCB is made where the Uno dev board is removed, the whole circuitry could be powered from the regulator on the dev board itself, eliminating the need for an external voltage regulator.
3. A smaller battery could be used to minimize the size. It is unlikely that a drone will be flying 12.5 hours every day. This would also minimize on weight.
4. The ADC on the Arduino could be used to sense and report on battery level.

Parachute

In some embodiments, the parachute 125 is chosen such that the parachute 125 supports a specified minimum weight, e.g., 4 kg, while keeping the descent rate to a specified maximum, e.g., approximately 4 m/s. This requirement can be essential to ensure the safety of humans upon collision; by having a low descent rate the impact upon collision is reduced. This would mean that if the drone is to collide with an external object then, then the damage is minimized for both the drone and the object.

In some embodiments, the parachute 125 is configured to:
1. support a specified weight, e.g., 4 kg.
2. provide a specified maximum descent rate, e.g., approximately 4 m/s.
3. be compact, so that it doesn't take up too much space on the drone.
4. not weigh more than a specified amount, so that it doesn't contribute extra mass to the drone.

In some embodiments, the size of the parachute 125 is determined as a function of the maximum weight of the drone on which the parachute 125 is going to be installed as well as the maximum desired descent rate. In some embodiments, parachutes with 48 and 60 inch diameter will support a 4 kg drone with a maximum desired descend at nearly 5 and 4 m/s respectively.

In some embodiments, the parachute 125 illustrated in the figures can be one of the standard parachutes available in the market. While choosing the actual parachute, it is essential to note the space available, the weight it contributes to the drone and the deployment method. In some embodiments, a gas based deployment system can be used to deploy the parachute 125, where gases like $CO_2$ are used for quickly ejecting the parachute 125. However, the gas canisters may have to be continually replaced after every deployment.

Figure 7:
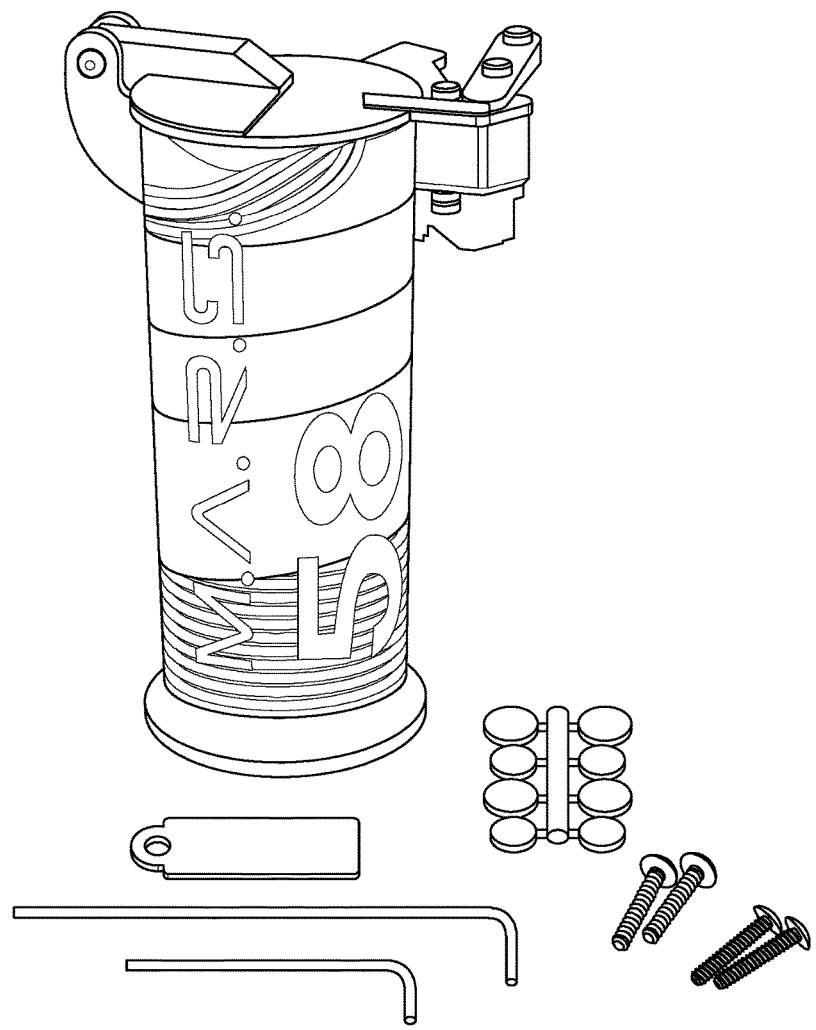
FIG. 7 shows an example of a parachute that can be employed in a parachute deployment system (PDS) of the drone, consistent with various embodiments.

FIG. 7 shows an example of a parachute 125 that can be employed in the PDS 190, consistent with various embodiments. In some embodiments, spring loaded parachutes can be installed on the drones. The spring-loaded parachutes are reusable and can be deployed by powering the servo motor to release the highly compressed spring inside a canister which ejects the chute for deployment.

Figure 8:
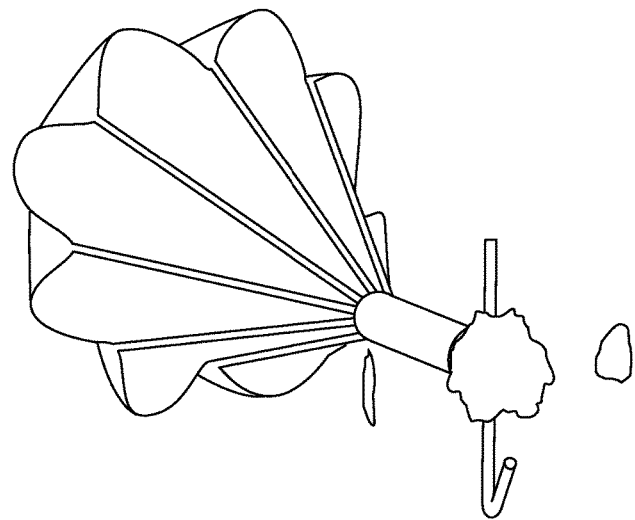
FIG. 8 shows examples of different types of parachutes that can be installed on the drone, consistent with various embodiments.
Figure 8:
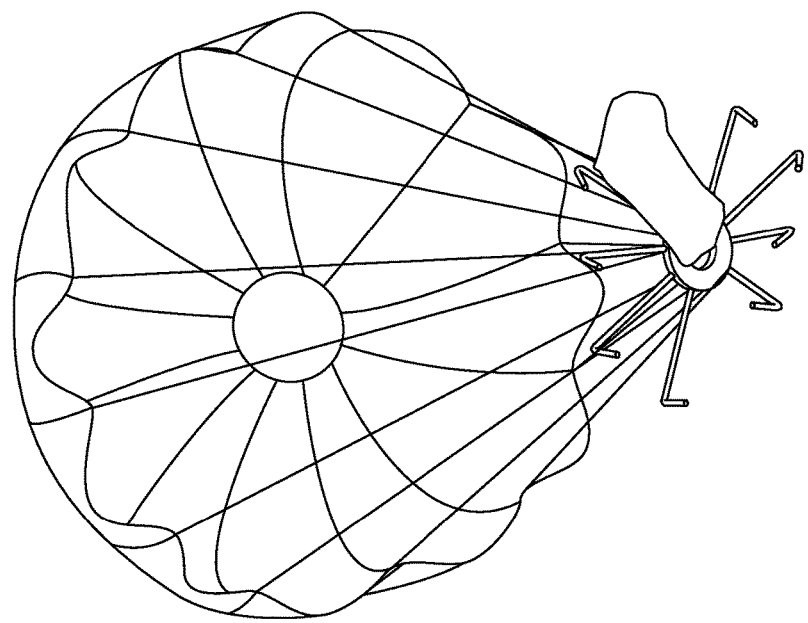

FIG. 8 shows examples of different types of parachutes that can be installed on the drone, consistent with various embodiments. The FIG. 8 illustrates a type A parachute (left) and a type B parachute (right). As can be seen, there is a large hole in the middle of the type A parachute while type B is fully covered. In some embodiments, since the type B the chute is fully covered it would offer greater drag, resulting in a lower descending rate.

If the drones are larger, e.g., heavier than 4 kgs, a parachute larger than 58" may be installed. For example, a 192" parachute can support a 20 kg weight and offer a descent rate less than 3 m/s.

Motor Cut-Off

In order for the drone to safely land in the event of failure of the drone, the motors need to shut-off when the parachute 125 is deployed. In some embodiments, the motors are shut off nearly instantaneously when commanded otherwise the parachute 125 may not deploy properly or get tangled in rotors.

The power can be shut-off from the battery to the rest of the drone. However, the switch that needs to be fitted would need to be capable of handling the maximum current that can be supplied by the battery. For example, each motor can draw up to 38 A when fully powered and on a quadcopter drone this can mean a current draw of up to 152 A for the motors alone. If the battery is rated 30 C at 8000 mAh, this can mean that the maximum current it can provide is 240 A, which is quite a large current and would require relays that are bulky and heavy (household circuitry).

Another alternative is to connect a large number of power-MOSFETs in parallel and control them all as the same switch. This can again be quite a large circuit and would also require the knowhow of thermally regulating the components.

Another alternative is to use a mechanical switch, e.g., a spring loaded mechanical switch, that would disconnect the drone circuitry from the battery. However, it would involve mechanical components that could be easily destroyed or damaged upon failure and testing. It would also be susceptible to in-flight vibrations that could prematurely disconnect as a result of the vibrations.

Another alternative is to block the throttle signal from the flight controller to the motors of the drone, and substitute it with a zero throttle signal from the Arduino causing the motors to brake. The PDS 190 circuit multiplexers enable the signal from the flight controller to the ESC to be blocked off and a new zero throttle signal generated by the Arduino is sent to the ESC instead. Multiplexers can be used in order to be able to switch the signals from the flight controller output to the Arduino signal. In some embodiments, the signal to the motor drivers can be ground. With this, there can be some delay, e.g., 3 sec, in stopping the motors. This can mean that the motor controller registers this as 'signal lost' rather than a signal meaning "0" revolutions per minute (RPM). In order to find out the pulse-width modulation (PWM) frequency and duty cycle, the "0" RPM signal can be analyzed on an oscilloscope. The signal can be: 400 Hz, 3.3$V_{pp}$, and 44% duty cycle.

If any of these requirements are not met (with the exception of the duty cycle) then the motor controller will not acknowledge the signal and continue its operation for a specified time, e.g., 3 seconds. The duty cycle is 44% at rest, around 46% when it starts idling and can go up to 100% for full power.

Analogue multiplexers, e.g., 4052 4-channel from Jaycar, can be used since they are bidirectional and can allow for any voltage level. The multiplexers can come in several packages (plastic, ceramic, micro, chip carrier). Since there are only 2 per input, 2 chips may be needed on the quadcopter. The multiplexers can be controlled by 2 digital inputs (A and B).

Figure 9B:
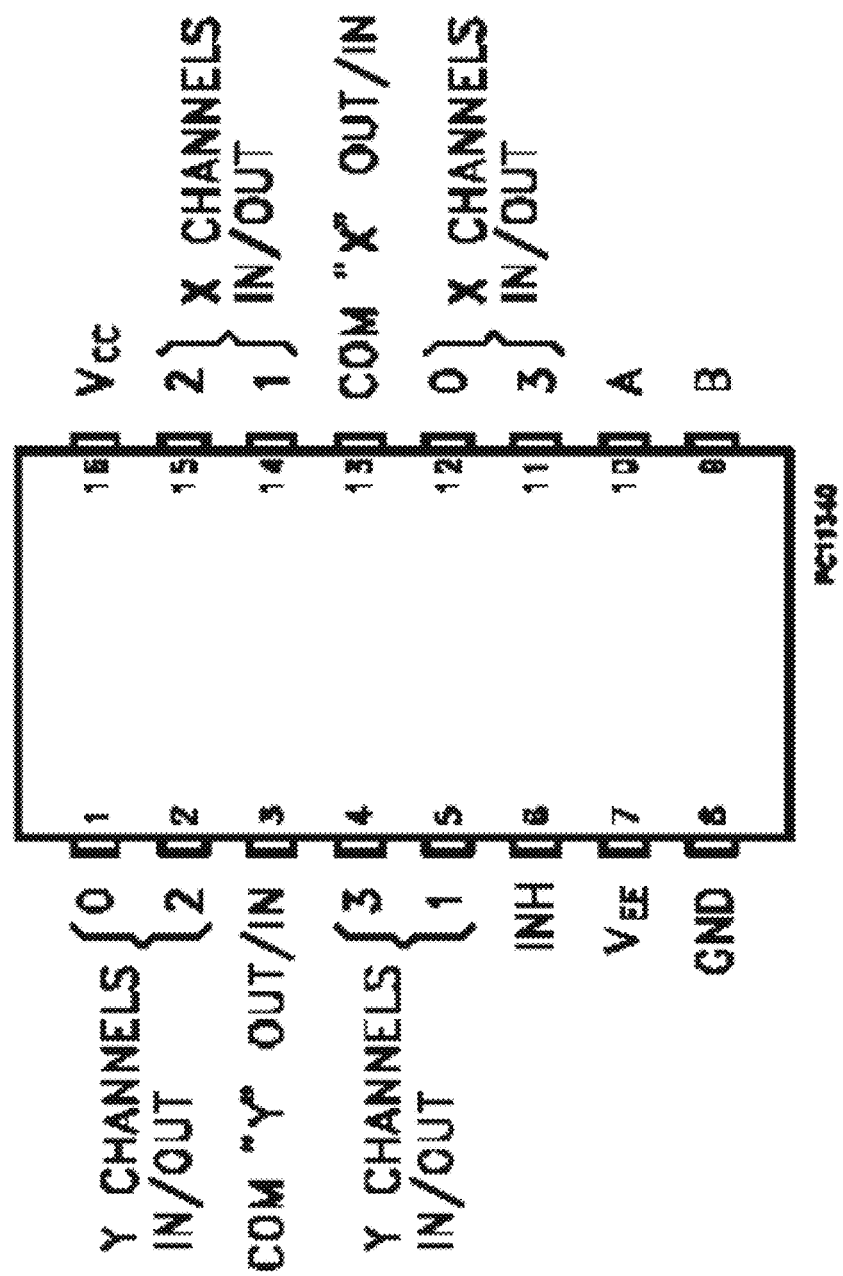
FIG. 9B shows a pin diagram for the analogue multiplexers, consistent with various embodiments.

FIG. 9A shows a logic table for the input states of the analogue multiplexers, consistent with various embodiments. FIG. 9B shows a pin diagram for the analogue multiplexers, consistent with various embodiments. The FIGS. 9A and 9B illustrate a logic table and pin assignments for the 4052 multiplexer. Since only two inputs need to be used (0X, 1X and 0Y, 1Y), B can be grounded and A can be controlled from the Arduino; minimizing the inputs required. Therefore, it would be as simple as setting a pin high. One of the inputs (0X) is connected to the output of the flight controller and the other input (1X) is coming in from the Arudino (the fake signal replicating 0 RPM conditions). The output (X) is connected to the motor controllers.

It should be noted that when multiple motor controllers are connected, the power buses are common going in and out of the PDS 190 (all black and red voltages are at the same level to and from the PDS 190). Ground should also be common with the PDS 190. In some embodiments, the Arduino Uno is capable of generating PWMs through its PWM function. On most pins, it is 490 Hz and 980 Hz on pin 5 and 6. In some embodiments, third party libraries can be used to set interrupts precisely when they need to fire. The signal therefore has to be 1100 microseconds high and then 1400 microseconds low.

Figure 10:
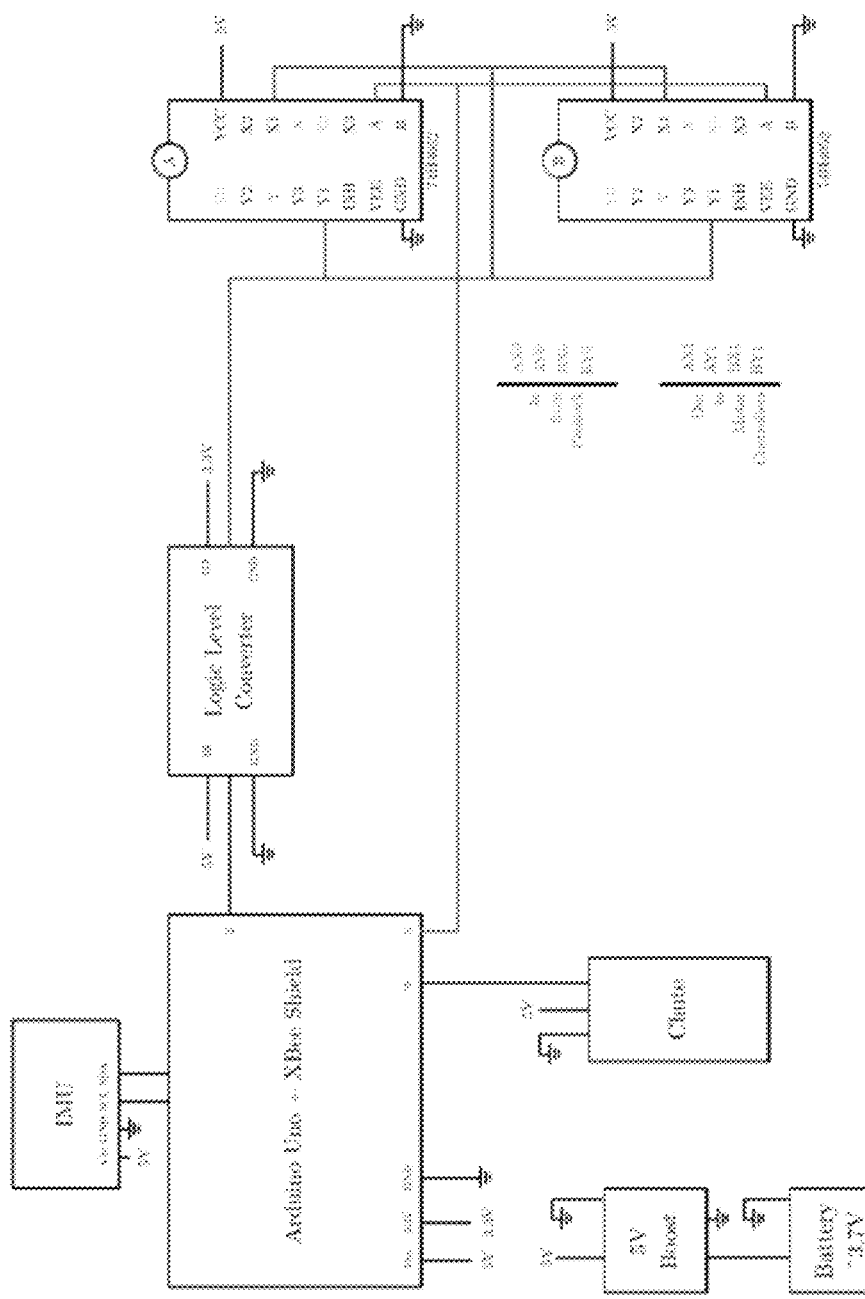
FIG. 10 shows a schematic for the circuit for shutting off the motors instantly, consistent with various embodiments.

With the following setup, the motors almost immediately stop rotating. FIG. 10 shows a schematic for the circuit for shutting off the motors instantly, consistent with various embodiments. FIG. 10 also shows the pin assignments for the PDS 190. Note that not all wires are shown.

Figure 12:
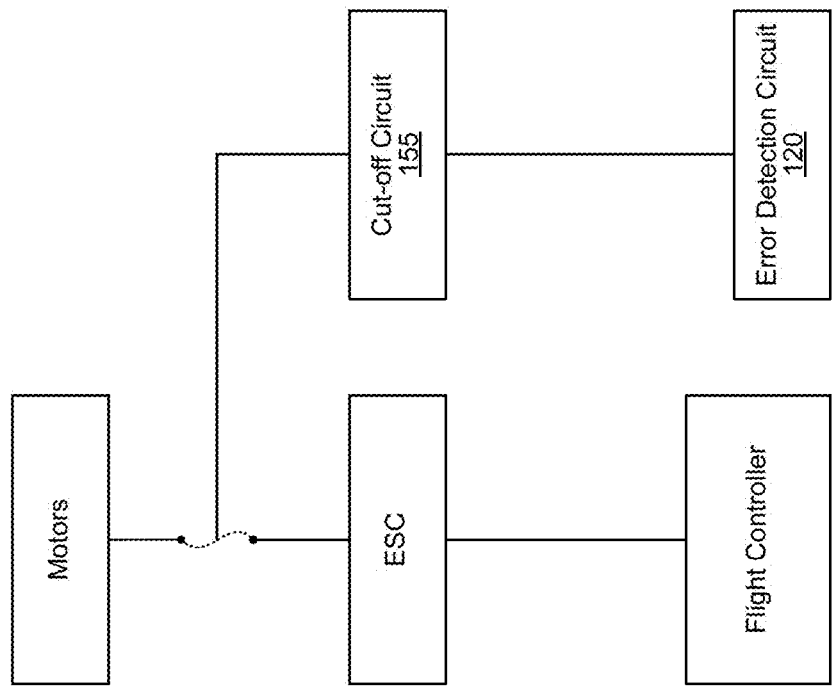
FIG. 12 is a block diagram illustrating an example for breaking an electrical connection between the ESC and motors of the lift mechanism of the drone, consistent with various embodiments.
Figure 11:
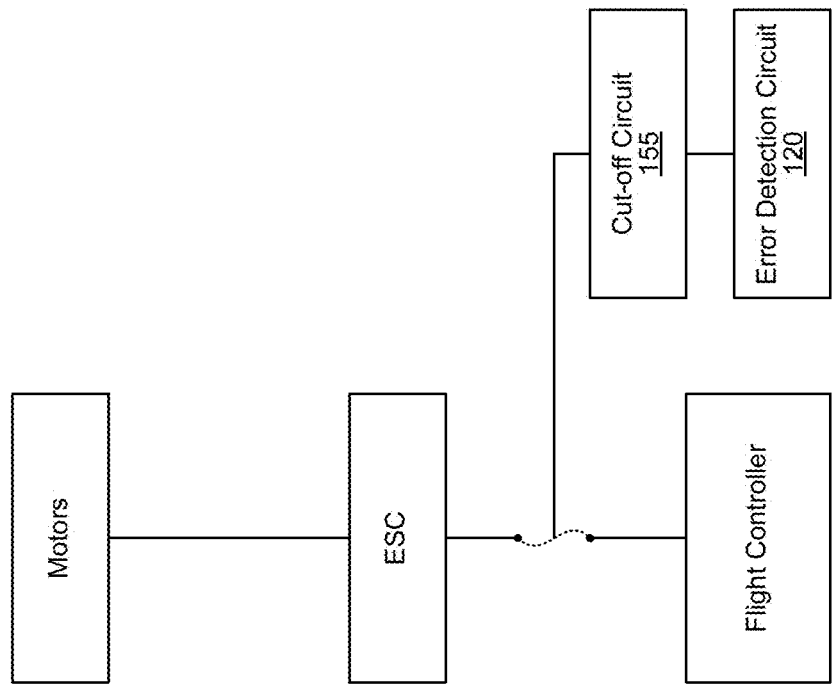
FIG. 11 is a block diagram illustrating an example for breaking an electrical connection between an auto pilot system of the drone and an electronic speed controller (ESC) of a lift mechanism of the drone, consistent with various embodiments.
Figure 13:
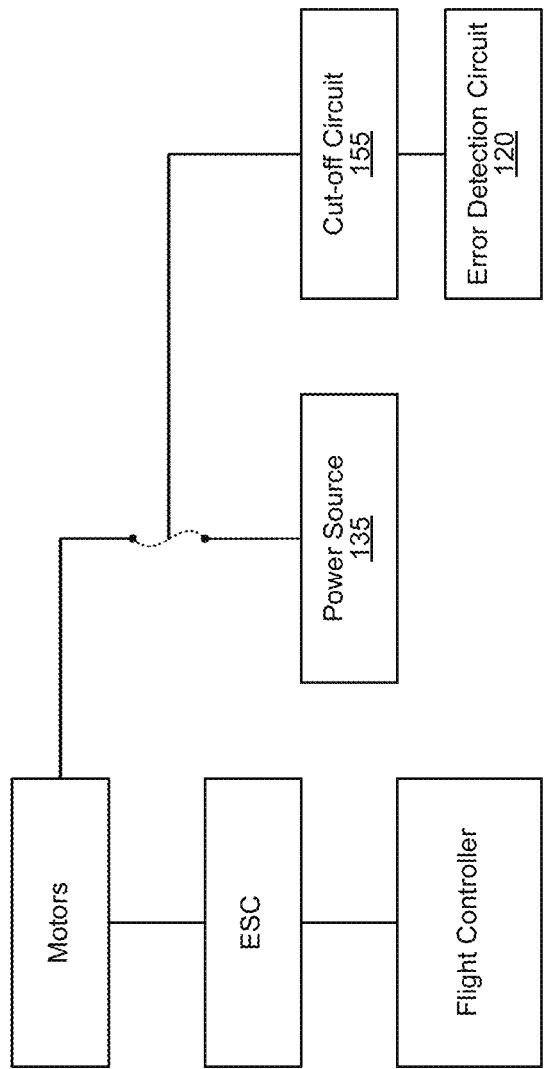
FIG. 13, is a block diagram illustrating an example for cutting-off the power supply to the motors of the lift mechanism of the drone, consistent with various embodiments.

Following are some other methods under which the lift mechanism 110 can be disabled. For example, as illustrated in FIG. 11, the cut-off circuit 155 can break the electrical connection between the auto pilot system (flight controller 115) and the ESC. When the power supply to the auto pilot system is disconnected, the lift mechanism 110 will be disabled. In another example, as illustrated in FIG. 12, the cut-off circuit 155 can break the electrical connection between the ESC and the motors of the lift mechanism 110. In another example, as illustrated in FIG. 13, the cut-off circuit 155 can cut-off the power supply to the motors of the lift mechanism 110. In another example, the cut-off circuit 155 can facilitate physically cutting the electrical connection to stop signal to the motors. The PDS 190 can have a severing mechanism to physically cut-off the electrical connection. In another example, the cut-off circuit 155 can facilitate physically braking the motors, e.g., by sending a signal to activate the brake pads of the motors. In another example, the cut-off circuit 155 can facilitate ejecting of the propellers of the lift mechanism. The cut-off circuit 155 can be implemented in various ways for each of the above methods.

Rotor Protection Shroud (RPS)

To further minimize the damage to the rotors and/or surroundings upon landing, the rotor blades of the drone 100 may have to be protected with shrouding. The embodiments provide a scalable, minimalist design for the shrouding that experiences little vibrations. The shrouding can be built using carbon fiber material.

In some embodiments, a rotor shroud offers sufficient protection against the tips of the blades should it bump into an object or as it comes in to land after the deployment of the parachute 125. In some embodiments, the rotor shroud is configured to be:
1. lightweight, e.g., weight not exceeding a specified amount, so that it doesn't add significant additional weight to the drone;
2. complete shielding of the rotor, so that the blades don't come into contact with object upon collision; and
3. durable upon impact, so that the structure doesn't damage the drone or cause more harm to a person the drone collided into.

The following paragraphs describe a RPS designed for a quadcopter of 4 kg with 11 inch blades (279.4 mm diameter), which can also be upgraded to the hexa-copter with 15-inch blades. However, the RPS designs can be extended to various types of drones. The collision analysis can be made assuming the worst-case scenario where the drone is free-falling; therefore a force of 39.24N was applied to testing the deflection of the structure. Also, the RPS can be made according to various designs, each having their own characteristics.

Figure 14:
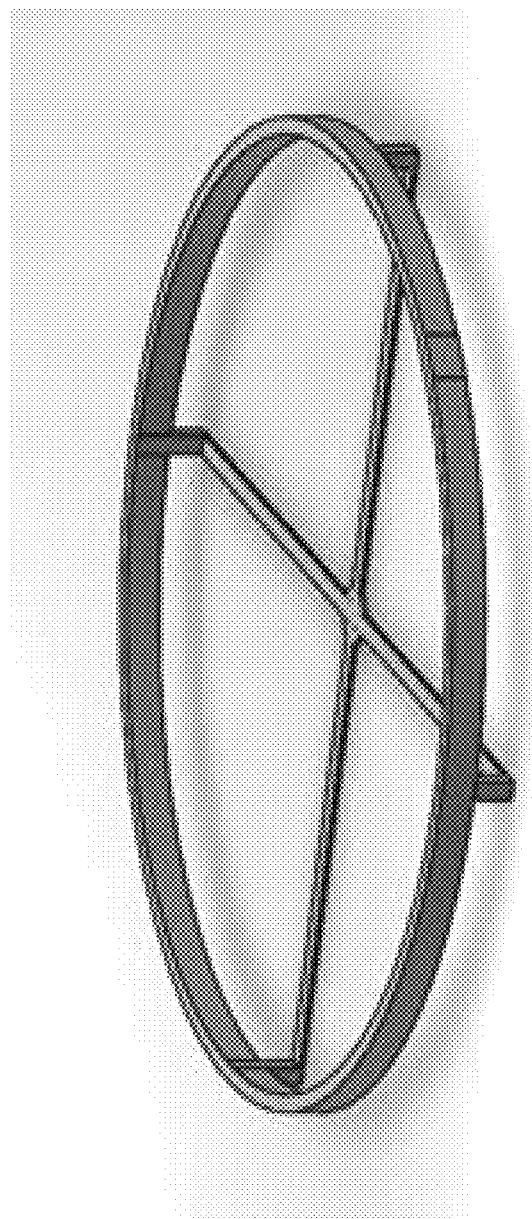
FIG. 14 shows a first design for a rotor protection shroud (RPS), consistent with various embodiments.

FIG. 14 shows a first design for the RPS, consistent with various embodiments. The first design can be based on stock rotor protection shrouds, which are seen on hobby quadcopters. The model's 300 mm diameter circular wall visually offers complete shielding. The shroud can be of VeroWhite material, which has similar properties to Acrylonitrile butadiene styrene (ABS).

Figure 15A:
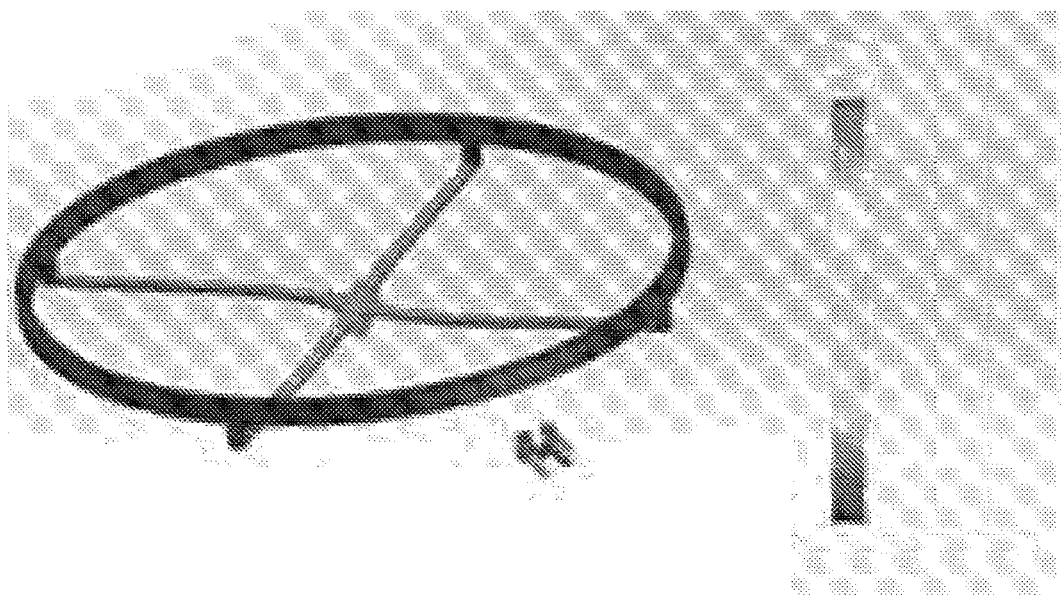
FIG. 15A shows a result of the stress analysis of the RPS designed based on the first design of FIG. 14, consistent with various embodiments.
Figure 15B:
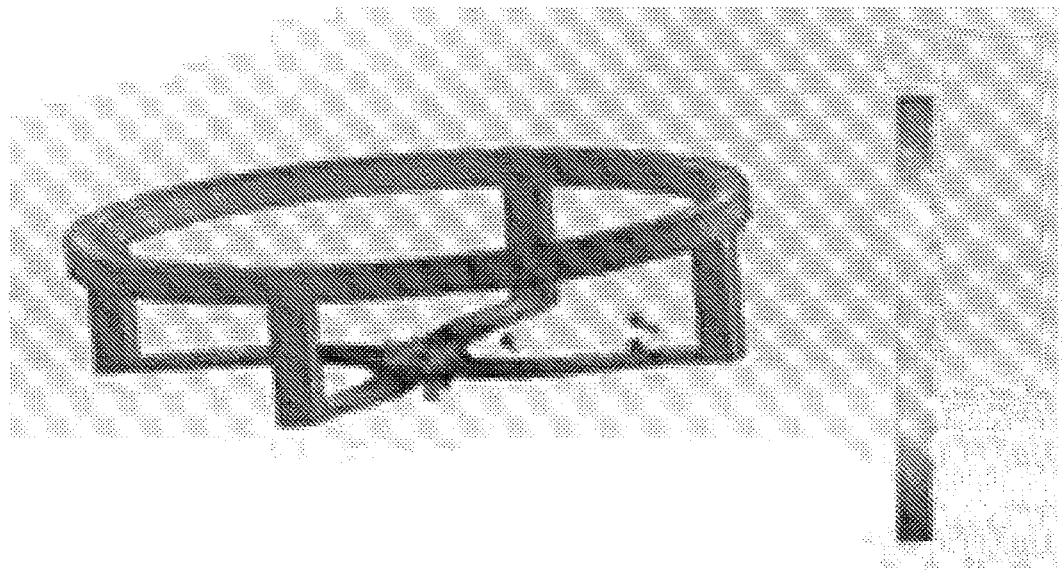
FIG. 15B shows a result of the deflection analysis of the RPS designed based on the first design of FIG. 14, consistent with various embodiments.

FIG. 15A shows a result of the stress analysis of the RPS designed based on the first design of FIG. 14, consistent with various embodiments. FIG. 15B shows a result of the deflection analysis of the RPS designed based on the first design of FIG. 14, consistent with various embodiments. The result shows over 39 mm of predicted deflection, while the maximum stress experienced by the structure is lower than the yield strength (it will not break), there is only a 10.3 mm allowance gap between the blade and the shroud at any given time. This means that upon collision the shroud can push into the blade, damaging and possibly breaking the blade. Such a disaster poses a great threat if it was to collide into a human, as the blade broken while spinning at high velocity can act unpredictably and can severely harm the person. Strengthening the structure to reduce deflection is not an option, simply because the model currently weighs 350 g per unit, therefore for a quadcopter the total rotor protection shroud unit will weight over 1.2 kg. Such a weight may not be ideal for a drone, as it compromises the flying performance.

Figure 16:
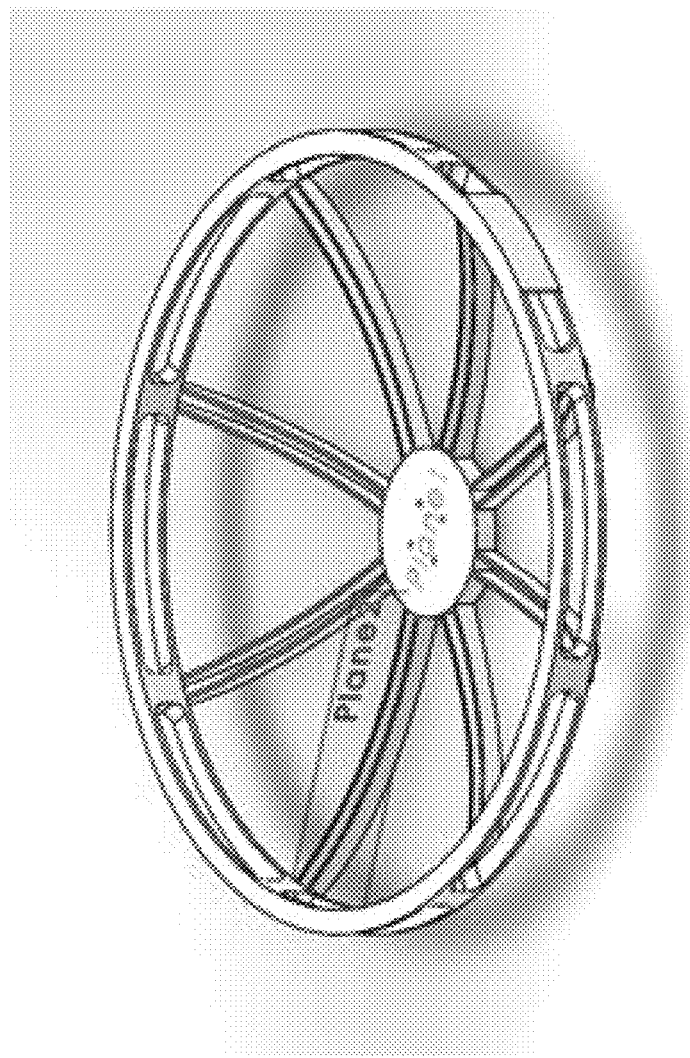
FIG. 16 shows a second design for the RPS, consistent with various embodiments.

FIG. 16 shows a second design for the RPS, consistent with various embodiments. The second design addresses the problems faced in the first design. The change includes transforming the right-angled struts into elliptical support beams, as curved supporting features shown in the model offer greater structural strength during tension and compression while reducing material needed. The second issue of weight is also addressed by making the structure as "empty" as possible without compromising the structural strength, which facilitated in increasing the gap between the blade and the guard to allow for greater impacts.

Figure 17A:
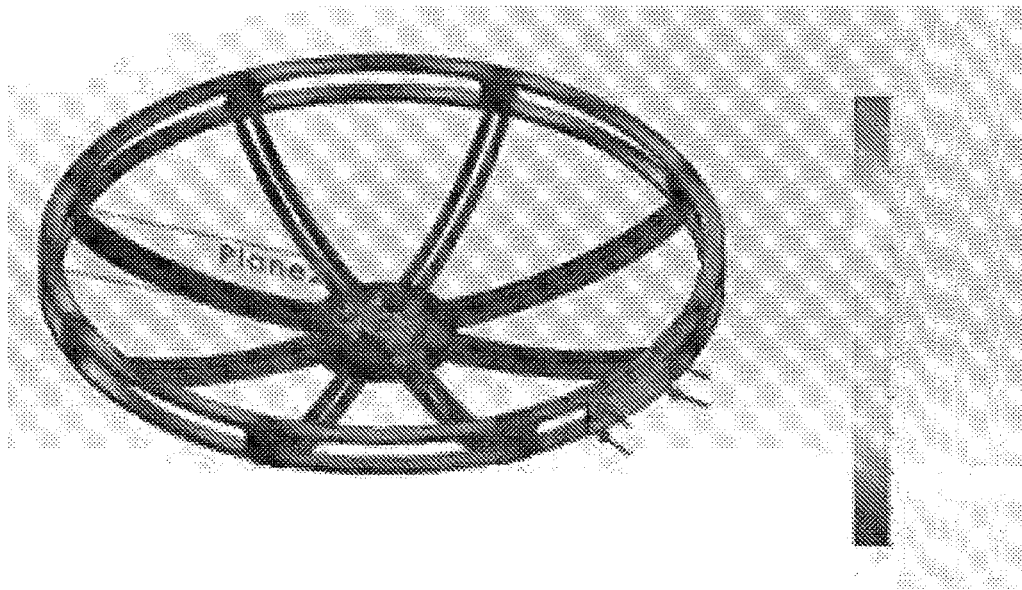
FIG. 17A shows the result of stress analysis of the RPS designed based on the second design of FIG. 16, consistent with various embodiments.
Figure 17B:
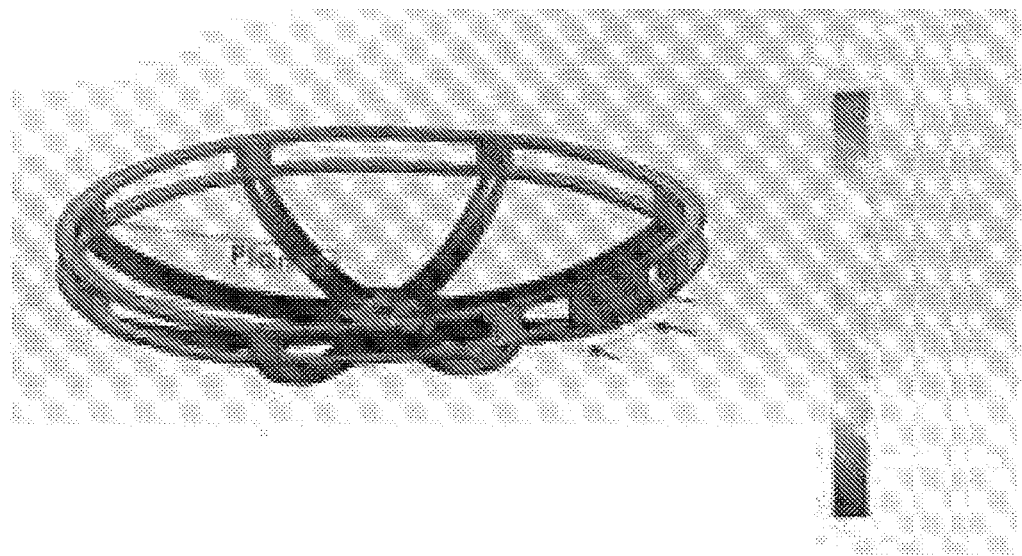
FIG. 17B shows the result of deflection analysis of the RPS designed based on the second design of FIG. 16, consistent with various embodiments.

FIGS. 17A and 17B show the results of finite element analysis (FEA) conducted on the second design, consistent with various embodiments. FIG. 13A shows the result of stress analysis of the model and FIG. 13B shows the result of deflection analysis of the model. From the results acquired, it is evident that maximum stress experienced by this structure is lower than the RPS of the first design and well below its breaking point. Also, the maximum deflection was found to be 13.34 mm, while the allowable displacement is over 15 mm, which means that even upon impact our structure stays intact and continues to provide shielding from the blades. The mass of structure was found to be 145 g, which is less than half the first design, hence a quadcopter would carry an additional weight of 580 g.

Figure 18:
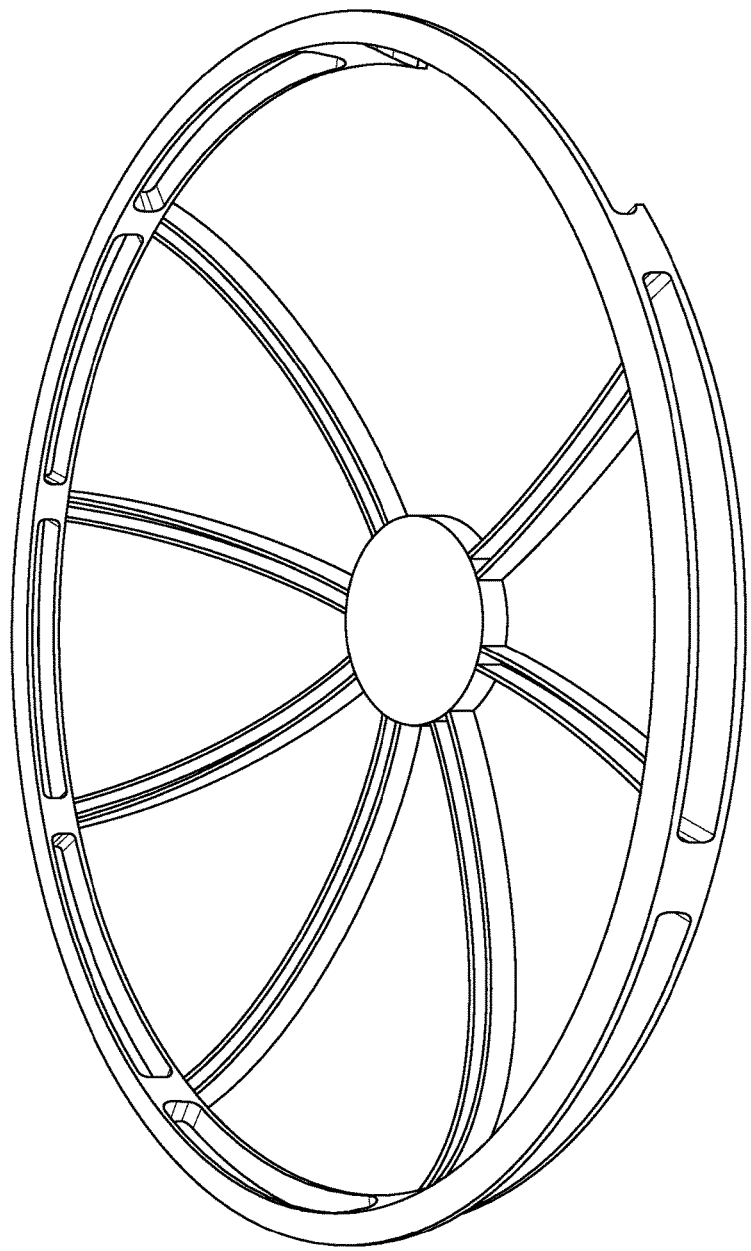
FIG. 18 shows a 3D printed model of the RPS based on the second design, consistent with various embodiments.

FIG. 18 shows a 3D printed model of the RPS based pm the second design, consistent with various embodiments. The 3D printed model is made using VeroWhite.

Figure 19:
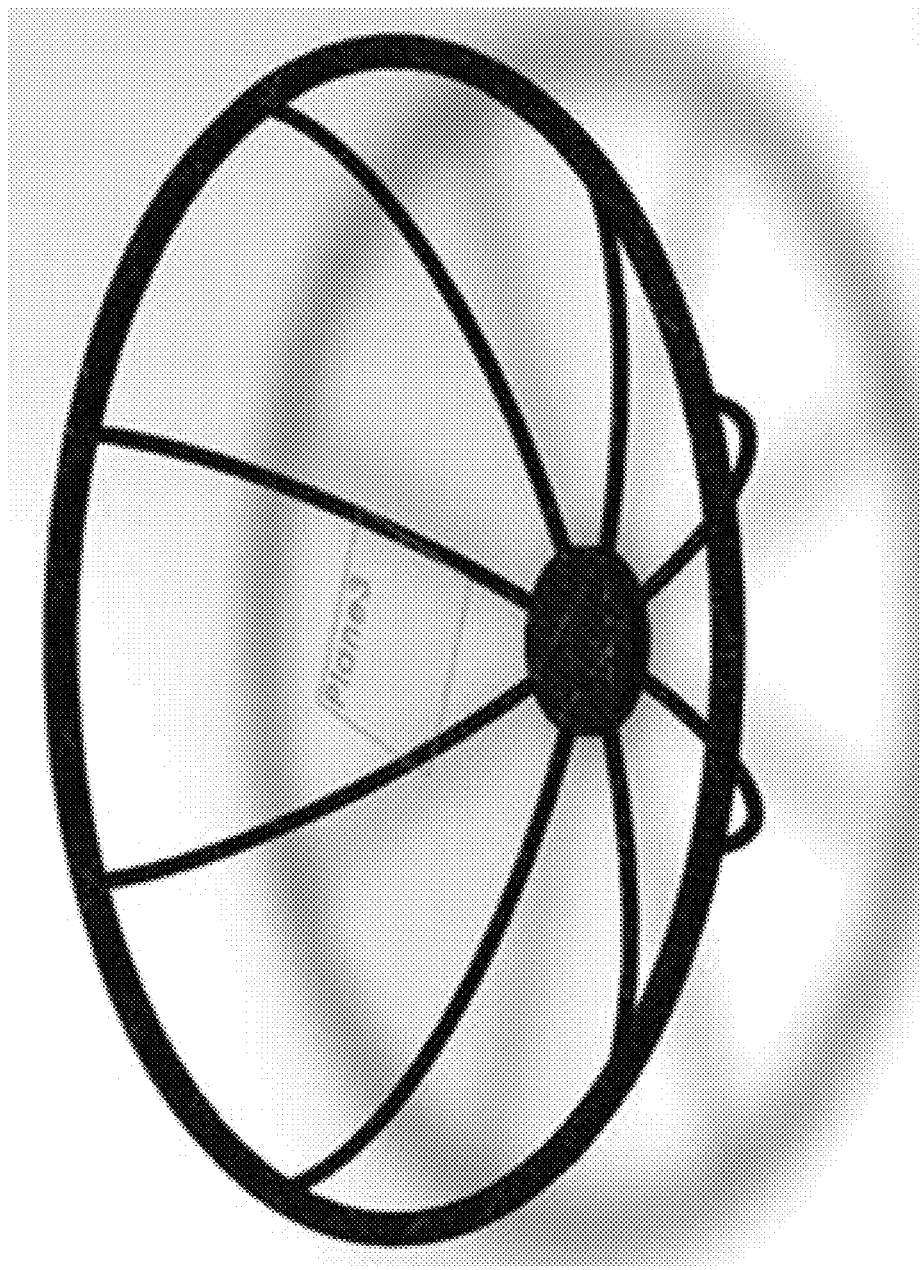
FIG. 19 shows a third design for the RPS, consistent with various embodiments.

FIG. 19 shows a third design for the RPS, consistent with various embodiments. In some embodiments, the RPS based on the third design is made using carbon fiber. While carbon fiber is more dense compared to VeroWhite/ABS, it has an excellent weight to strength ratio. This can mean that the material used for the shroud can be further reduced while increasing the structure's strength. In some embodiments, the third design is similar to the second design, however rather than supporting struts it has a tubular network as shown in the FIG. 19.

Figure 20A:
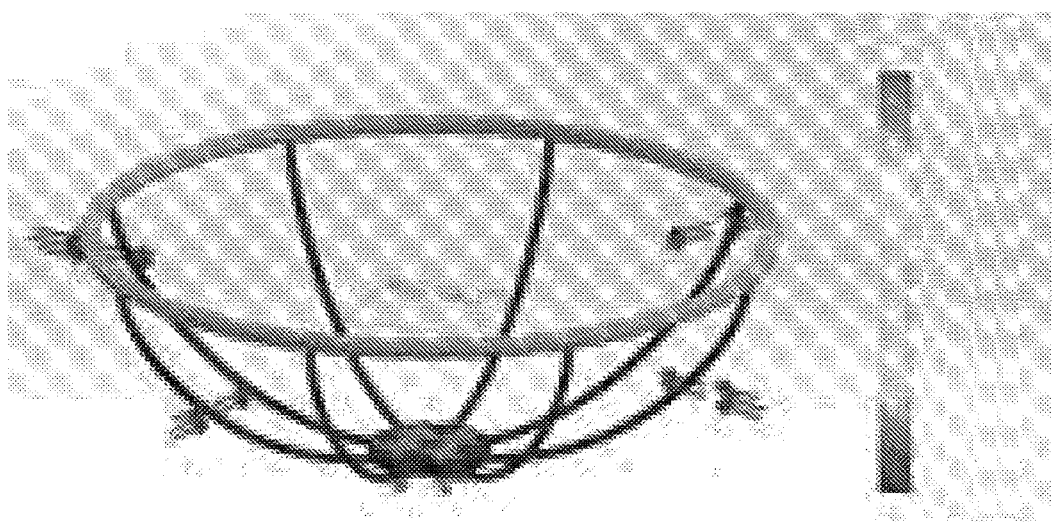
FIG. 20A shows the result of stress analysis of the RPS designed based on the third design of FIG. 19, consistent with various embodiments.
Figure 20B:
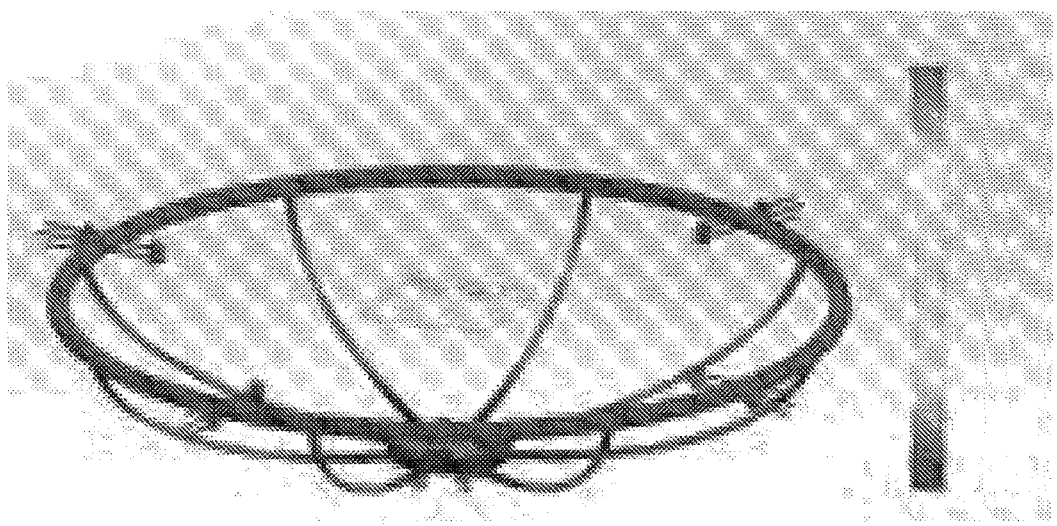
FIG. 20B shows the result of deflection analysis of the RPS designed based on the third design of FIG. 19, consistent with various embodiments.

FIGS. 20A and 20B show the results of the FEA conducted on the third design, consistent with various embodiments. FIG. 20A shows the result of stress analysis of the model, and FIG. 20B shows the result of deflection analysis of the model. From the results, it can be concluded that the structure can easily support the weight of the drone, and safely shield the blades from external objects. In some embodiments, the mass of this structure is 77 g, which would mean a saving of 310 g compared to previous designs for excellent safety system.

In some embodiments, carbon fiber tubes which are of straight shapes, e.g., as in the first design, instead of an elliptical fashion as in the third design can also be used. While the mass of the first design is deemed to be heavy, making the carbon fiber model hollow can solve the problem.

The following paragraphs describe some example features of the drone and the base unit (e.g., remote controller operated by a remote user to navigate and/or kill the drone) that can be used with the disclosed embodiments.

Drone Unit
    Support for hexacopter (2 sets of 3×6 pins)
    IMU auto deploy algorithm, which deploys the parachute 125 automatically when a failure of the drone is detected, e.g., as described at least with reference to automatic failure detection above
    Recalibrate min height from launch height
    Reset pin
    Wireless communications with Xbee 900HP:
        Manual trigger
        Auto deploy on/off
    ESC 0 RPM signal reproduction: 44% duty cycle at 400 Hz
    78.7×39.4 mm
    Pins for chute servo
    4 hour battery life (untested—estimate)
    Removable microprocessor
    Servo cable mounts (0.1" servo cables)
    Status LED
    NOTE: Powered by 3.7V Li-ion from Adafruit. This can be the 6600 mAh battery (blue cylinders) with no protection circuit as the current draw from the Mars 120 parachute is too large for the batteries with protection circuits (white with yellow tape on top).

Base Unit

In some embodiments, the base unit 195 can be configured to have the following:

- Deploy switch, e.g., push-button for deployment—to send a signal to an onboard "kill" switch on the drone 100 that, when activated, causes the drone 100 to deploy the parachute 125
- Auto deployment switch, e.g., DIP switch for on/off auto deployment—to enable or disable auto deployment of the parachute 125 on the drone 100 in response to a failure of the drone 100
- Communications system, e.g., Xbee 900HP,—to send and receive instructions from the drone 100.
- I/O switch on the side
- Arming flip switch (guard optional)—to enable or disable manual deployment of the parachute 125 from the base unit 195
- Battery, e.g., 3.7V Li-ion rechargeable battery In some embodiments, the deploy switch sends the signal to the "kill" switch on the drone 100 if the arming switch is enabled and when the deploy switch is activated by the remote operator 105.

Following are some example instructions for installing the PDS 190 on the drone:

- Plug the ESC cables from the flight controller into the IN ports on the unit. The direction is labelled on the PCB (SIG is the topmost pin).
- Plug the motor ESC cables into the OUT ports on the unit.
- Connect the 3.7V battery.
- Reset the unit. So that the green LED is solid green and not flashing green.
- Proceed to turn on the drone normally.
- The LED will blink green when the parachute 125 has been deployed. Use the Reset button to switch it back into normal mode. The servo on the parachute 125 will also reset to its closed position.

Following are some example instructions for navigating the drone and deploying the parachute 125:

Installation and Use

1. On the drone unit, plug the ESC cables from the flight controller into the IN ports on the unit. The direction is labelled on the PCB (SIG is the topmost pin).
2. Plug the motor ESC cables into the OUT ports on the unit.
3. Connect the 3.7V battery.
4. Reset the unit. This is important! So that the green LED is solid green and not flashing green.
5. Proceed to turn on the drone normally.
6. Continue on the handheld unit: Power on the unit and observe red LED. If this is solid, then a connection has been established. This LED will turn off when the unit has lost connection.
7. Green switch can be used to turn on/off the auto-deploy. It is recommended to have this off as the vibrations on the IMU on the drone can be very excessive (+/−5 m/s^2) and trigger when spinning at take-off RPMs.
8. To deploy: flip the arming switch to the ON position, then press the red pushbutton.
9. The green LED on the drone unit should start to flash green, indicating the parachute 125 has been deployed. The red LED on the handheld unit should start to flash.
10. To reset: Turn OFF the handheld unit, then press the RESET pushbutton switch on the drone unit. The green LED should now be solid again. This will also move the Mars Parachute servo to the CLOSED position.
11. Turn the handheld unit back ON.

In summary, the LED on the drone unit:
GREEN: Solid=ON. Off=OFF. Flashing=DEPLOYED.

Handheld Unit:
GREEN: Solid=ON. Off=OFF.
RED: Solid=Link established. Off=Link lost. Flashing=DEPLOYED.
YELLOW: Solid=AUTO ON. Off=AUTO OFF.

XBees

Any set of matching XBees can be used. The recommended XBees (currently in use) are:
XBee-PRO 900HP (S3B)—XBP9B-DPST-001—Point2Multipoint, 900 MHz, 250 mW, RPSMA, 10 Kbps (North America)

There are pairs of XBees matched to each other (e.g., 1A and 1B, 2A and 2B). They will only be able to send and receive messages to each other (done using addressing). On top of this, all communications are encrypted.

Encryption

The XBees are encrypted using AES. The key is: 0F89EEECCFBF1E67555AE88D8171E2A2

Range Test

The Xbee range test carried out here is for the old 200 Kpbs Xbee (XBP9B-DMST-012). The new Xbees (10 Kbps) offer a greater theoretical range (yet untested) and come with 900 MHz dipole antennas (larger but offer better range).

XBee-PRO 900HP (S3B) DigiMesh, 905/920 MHz, 250 mW, RPSMA Antenna, 200 Kbps (Brazil)

The 900HP set are used because they are more powerful than the Series 1 and Series 2 Pro XBees. The LOS range was tested and around 335 m packets were starting to be lost (see graph below—starting point is 0 m to 335 m). 2.4 GHz antennas were used for this test as no 900 MHz ones were available.

Figure 21:
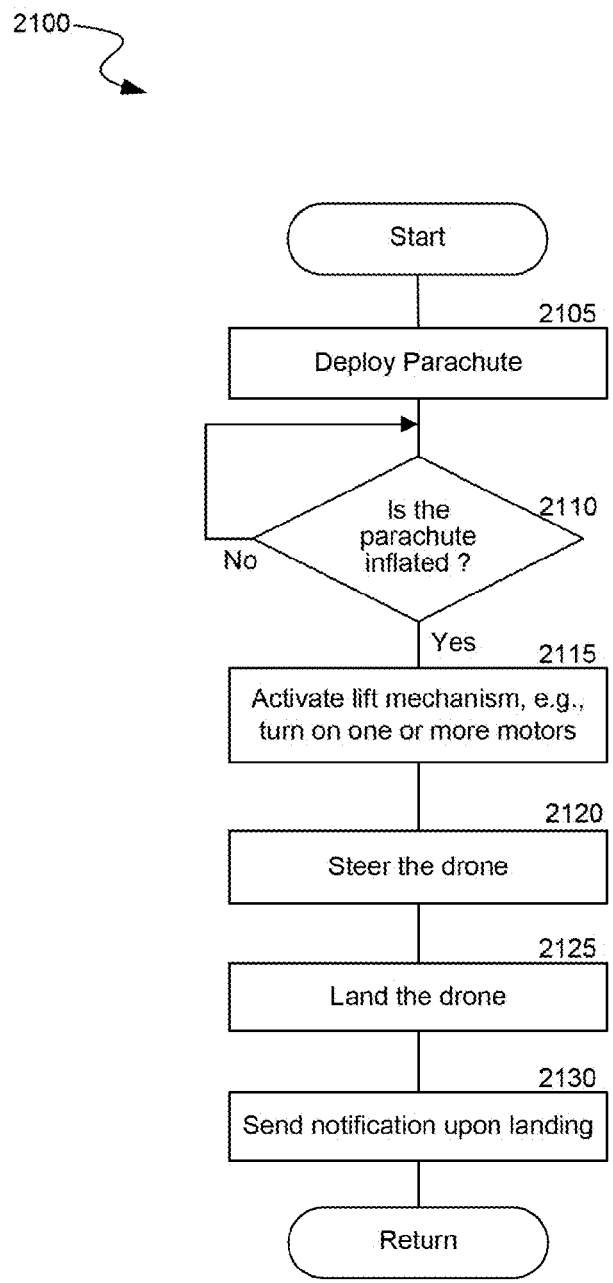
FIG. 21 is a flow diagram of a process for a motorized descent of the drone with the parachute ejected, consistent with various embodiments.

FIG. 21 is a flow diagram of a process for a motorized descent of the drone with the parachute ejected, consistent with various embodiments. The process 2100 may be implemented using the drone 100 of FIG. 1. The drone 100 may be steered to a particular landing location, e.g., a safe landing location, with the parachute ejected. In some embodiments, the particular landing location details, e.g., GPS co-ordinates, are provided to the drone 100 by the remote operator 105 or from a ground control station. In some embodiments, the flight controller 115 or the PDS 190 determines the safe landing location based on one or more parameters, e.g., any humans, or objects of a specified size within a specified area around the drone 100, density of humans or objects within the specified area, an area of land or water within the specified area. As described at least with respect to FIGS. 1A and 2 above, the drone 100 can be steered to the particular landing location by steering the parachute 125. In some embodiments, the lift mechanism 110, e.g., one or more of the motors of the drone 100, can be used to steer the drone 100 to the particular landing location with the parachute 125 ejected, e.g., in order to get a better control in steering the drone 100. The drone 100 can be steered using the motors in addition to or alternative to steering the parachute 125. In some embodiments, if the motors are not working, e.g., the power supply to the motors is cut-off, the drone 100 is steered by steering the parachute 125 and not the motors. The following paragraphs describe steering the drone 100 using the lift mechanism 110 with the parachute 125 ejected.

At block 2105, the parachute deployment mechanism 130 deploys the parachute 125. The parachute 125 can be deployed automatically in response to occurrence of a trigger event. In some embodiments, the trigger event is generated upon occurrence of an error, e.g., collision with another object, presence of another object within a specified proximity, speed and/or altitude exceeds a specified value, e.g., as described at least with reference to FIGS. 1A, 2 and 4. The parachute 125 can also be deployed manually, e.g., by the remote operator 105 at the base unit 195. In some embodiments, the remote operator 105 can activate the kill switch 193 on the drone 100 using the base unit 195, and the kill switch 193 can control the lift mechanism 110, e.g., stop some or all of the motors of the lift mechanism 110, and notify the parachute deployment mechanism 130 to deploy the parachute 125.

The parachute deployment mechanism 130 can be configured to inflate the parachute 125 instantaneously and/or rapidly upon deployment. In some embodiments, rapid inflation of the parachute 125 may be necessary to open the parachute 125 at lower altitudes, e.g., altitude below a specified threshold such as 15 meters, 12 meters or 10 meters, and therefore, avoid the drone 100 from crash landing, which can cause damage to the drone 100. The parachute deployment mechanism 130 can implement the rapid inflation of the parachute 125 using various means, e.g., ballistic or mechanical. For example, the parachute deployment mechanism 130 can use air or $CO_2$ gas to rapidly inflate the parachute 125. In another example, the parachute deployment mechanism 130 can use a spring loaded mechanism to rapidly inflate the parachute. In yet another example, the parachute deployment mechanism 130 can use pyrotechnics to rapidly inflate the parachute 125. In some embodiments, a projecting weight is connected to the parachute 125 to force open the parachute 125 more rapidly. The weight can be fired outward, e.g., in a semi-circular or circular pattern, and at a particular angle, e.g., 90 degrees off of the parachute 125, to cause the parachute 125 to deploy fully and instantaneously. The weight can be connected to the center of the parachute 125. When the parachute 125 is deployed, the weight is pulled down, due to gravity, causing the parachute 125 to immediately inflate/open up by its downward motion in the air.

In some embodiments, an umbrella-type mechanical mechanism is used to force open the parachute. For example, the umbrella type mechanism can include a folding canopy supported by ribs, which is mounted on a pole. In some embodiments, the parachute deployment mechanism 130 can blow open the parachute 125 with a rapid ejection of gas. For example, a gas canister filled with compressed gas, e.g., at an appropriate pressure, (or when the chemical is activated to create a controlled chemical explosion which generates gas) or a gunpowder type explosion, can release the gas at a rapid pressure resulting in instantaneous inflation of the parachute 125. In some embodiments, a ducted fan which generates airflow into the parachute 125 to cause the parachute 125 to rapidly inflate can be used. In some embodiments, vented or tubular inflatable supports can be included within the parachute 125 which can be filled with air to cause the parachute to rapidly inflate, e.g., like an inflatable air dancing man. In another example, a power activated piston in which a piston is released when it is supplied with electrical power releases a significant amount of energy, which can be used to eject and inflate the parachute 125 rapidly. The parachute 125 can be inflated within a specified time, e.g., milliseconds, which can significantly increase the chances of safe landing, especially when at low altitudes. Further, the parachute deployment mechanism 130 can ensure that parachute is deployed far beyond the propel spinning radius. Multiple parachutes can be installed on the drone 100 to get more drag and/or redundancy.

At block 2110, the parachute deployment mechanism 130 determines if the parachute 125 is inflated completely. If the parachute 125 is not inflated completely, the flight controller 115 waits until the parachute 125 is inflated completely. The parachute deployment mechanism 130 can notify the flight controller 115 after the parachute 125 has inflated completely, which in some embodiments, is when the drone 100 is ready for the flight controller 115 to regain control for performing a controlled landing. If the parachute 125 is inflated completely, at block 2115, the flight controller 115 activates the lift mechanism 110, e.g., powers on one or more of the motors of the drone 100. In some embodiments, the drone 100 experiences a sudden lift, a decrease in the descend speed, or can continue to fly at a specified altitude in response to an activation of the lift mechanism 110, all of which can delay the deployment of the parachute 125 or keep the parachute 125 from inflating completely. Accordingly, the flight controller 115 may not activate the lift mechanism 110 until the parachute 125 is inflated completely in order to avoid any further delay in the parachute 125 being deployed or inflated completely. The lift mechanism 110 can be activated automatically, e.g., based on a detection of the parachute 125 being deployed, or manually, e.g., by the remote operator 105 from the base unit 195. Further, the flight controller 115 can activate the lift mechanism 110 in a controlled manner, e.g., turning on and/or adjusting the speed of one or more motors in a particular pattern or sequence, to assist in steering the drone 100 during the descent. In some embodiments, if the lift mechanism 110 is permanently disabled, e.g., not functional, the flight controller 115 may not activate the lift mechanism 110. If the lift mechanism 110 is partially disabled, e.g., some of the motors are functional and some are not functional, the flight controller 115 may activate the portion of the lift mechanism 110 that is functional.

At block 2120, the flight controller 115 manages steering the drone 100 to the particular landing location using the lift mechanism 110. The drone 100 can be steered using the lift mechanism 110 and/or the parachute 125. In an event where the lift mechanism 110 is partially disabled, the flight controller 115 may adjust the load of the drone 100 on the portion of the lift mechanism 110 that is functional, e.g., on one or motors that is functional, and steer the drone 100 using the functional portion of the lift mechanism 110.

The drone 100 can be steered automatically (e.g., autonomously), or manually by the remote operator 105 using the base unit 195. In some embodiments, the flight controller 115 and/or another control unit, e.g., the PDS 190, can steer the drone 100 automatically/autonomously, e.g., using integrated sensors, such as video feed, sonar, radar, LIDAR, computer vision, infra-red, NIR, thermal, sonic, of the drone 100, facilitates in avoiding obstacles and landing the drone 100 at the safest available location or a specified location. For example, the flight controller 115 can communicate with the video system 165 to monitor the environment around the drone 100 and the PDS 190 can automatically send commands to control the lift mechanism 110, e.g., aelerons and propellers, (which was shut off when the parachute 125 ejected) in order to control the drone 100 and land the drone 100 at the safest available location in the event of the failure of the drone 100. In another example, the drone 100 can be steered manually by the remote operator 105 from the base unit 195, e.g., using a live video feed from the drone 100, GPS coordinates, or directly if the drone 100 is in a line of sight of the remote operator 105. This can be to reduce the probability of impact with a person on the ground or landing in an unsafe location such as a busy road or on a private property. Both of the steering methods, e.g., steering using the parachute and steering using the lift mechanism, can be performed autonomously by the drone 100 or manually by the remote operator 105. In some embodiments, the remote operator 105 can also override the autonomous steering of the drone 100.

At block 2125, the flight controller 115 lands the drone 100 at the particular landing location. At block 2130, after the drone 100 has landed at the particular landing location, the communication system 150 can send an audio notification, a video notification, or an audio-visual notification to the remote operator 105 at the base unit 195 indicating that the drone 100 has landed. The notification can also include various information, e.g., co-ordinates of the particular landing location, and a time at which the drone 100 landed.

The above described controlled steering of the drone 100 using the lift mechanism 110 can be implemented in a wide variety of drones, e.g., fixed-wing drones, helicopter rotors and blades based drones, or hybrid drones. For example, in a fixed-wing drone, the lift mechanism 110 can have ailerons using which the descent can be controlled. In rotors and blades based drones, some or all of the motors of the lift mechanism 110 may be activated to steer the drone 100. For example, in a quadcopter all of the motors may be activated and used to steer the drone 100 and in a hexacopter only four of the six motors may be used. In another example, in a hybrid drone in which the lift mechanism 110 has a single traditional propeller and ailerons, the drone 100 can be steered using this propeller and the ailerons during a motorized descent. The motor operations on a quadcopter can be different to those on a hexacopter, which will be different to those on a hybrid drone having one or more motors and ailerons, and the above steering mechanism can be implemented in any of these drones. The flight controller 115 can be programmed to identify the type of the drone 100 and implement the steering mechanism accordingly.

While the operations described above with reference to the process 2100 can be performed automatically by the drone 100 or manually by the remote operator 105, in some embodiments, at least some of the autonomous steering operations can be manually overridden by the remote operator 105. For example, the drone 100 may be programmed to land in a first landing location. However, the remote operator 105 can command the drone 100, e.g., during the descent, to land in a second landing location.

Figure 22:
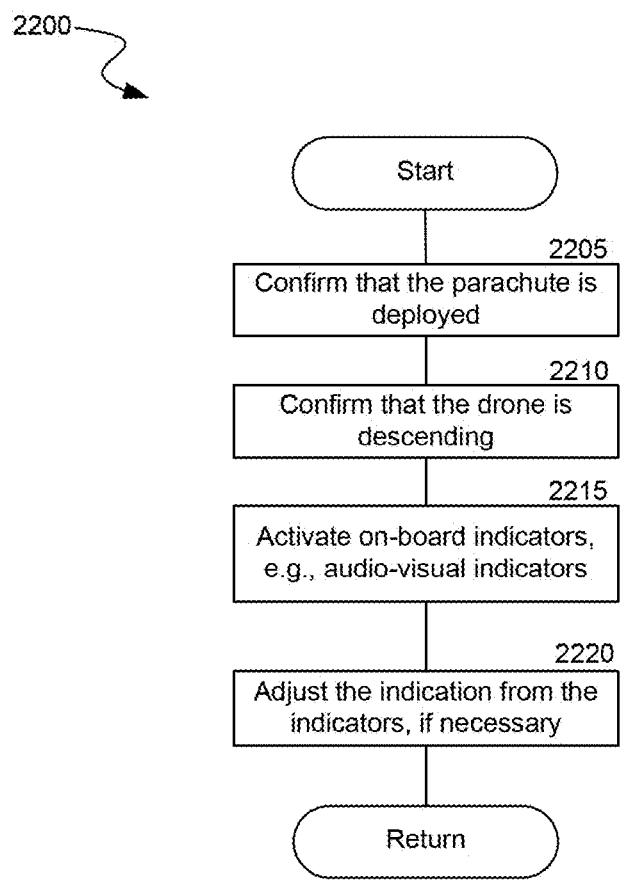
FIG. 22 is a flow diagram of a process for activating audio-visual indicators on a descending drone, consistent with various embodiments.

FIG. 22 is a flow diagram of a process 2200 for activating audio-visual indicators on a descending drone 100, consistent with various embodiments. The process 2200 may be implemented in the drone 100 of FIG. 1. At block 2205, the communication system 150 detects that the parachute 125 is deployed. In some embodiments, the communication system 150 obtains the deployment information of the parachute 125 from the parachute deployment mechanism 130. At block 2210, the communication system 150 confirms that the drone 100 is descending. For example, the communication system 150 can confirm that the drone 100 is descending based on the altitude of the drone 100 that can be determined using one or more sensors. At block 2215, the communication system 150 activates the on-board indicator on the drone 100 to indicate to people or another aircraft that the drone 100 is descending and about to land. In some embodiments, the indicator is activated to notify the landing of the drone 100 to the people in the vicinity of the landing area so that people can be cautious and can move or move other objects from that location in order to avoid any impact with the drone 100. The on-board indicator can be an audio indicator, a visual indicator or an audio-visual indicator. In some embodiments, the audio indicator can be an audio signal, e.g., a siren, that is loud enough to be heard by the people in the vicinity. In some embodiments, the visual indicator can be one or more lights. In some embodiments, the lights can be of high-intensity and also be configured to flash to get the attention of the people. The indicators can be used for reducing the probability of impact of the drone 100 with a person or aircraft. In some embodiments, the indicators are powered using a back-up power supply.

The drone 100 can be configured to use different indicators in different scenarios. For example, the drone 100 can be configured to use audio indicators during daytime, and audio and/or visual indicators during night.

Further, at block 2220, the communication system 150 can also be configured to adjust the indication, e.g., vary the strength of the indication, based on various factors, e.g., the altitude of the drone, presence or absence of humans in the vicinity of the landing location. For example, the drone 100 can be configured to increase the volume of the audio signal, increase the intensity of the light, or flash the light more rapidly as it approaches the landing location. In another example, if the drone 100 does not detect any person or objects in the vicinity of the landing location, it may turn off or decrease the intensity of the signal as it approaches the landing location. The drone 100 can use one or more sensors onboard, e.g., video camera, motion sensors, to detect the presence of any human and/or an object in the vicinity of the landing location.

The PDS 190 can act as an active safety system of the drone 100, which helps in ensuring that a flight of the drone 100 over humans or properties is safe for the humans and/or properties even in the event of a failure of the drone 100. In some embodiments, the drone 100 has a passive safety system, e.g., polycarbonate-based or padding such as foam, on the underside of the drone 100. The passive safety system can reduce the risk of a serious injury in an event the drone 100 lands on a person and/or property. The padding can be of various forms. For example, the padding can be made of vinyl nitrile foam and can be similar to the padding used inside a football helmet, e.g., typically 4-5 cm in thickness. In another example, the padding can be Expanded Polypropylene (EPP) foam. In still another example, the padding can be Expanded Polystyrene (EPS) foam. In yet another example, the padding can be an inflatable air cushion. The air cushion can be permanently deployed (e.g., like an inflatable seat cushion) or can be deployed, e.g., like a deployable airbag in response to a trigger event, such as deployment of the parachute 125.

In some embodiments, the thickness of the padding can be proportional to the center of gravity of the drone 100. For example, the padding is thicker at an area closer to a center of gravity of the drone 100, or representative of a thicker foam of lower density. Having the thickness of the padding proportional to the center of gravity can reduce the risk of a serious injury in an event the drone 100 lands on a person after the parachute 125 is ejected. In some embodiments, the passive safety system can be incorporated into an airframe of the drone 100. The passive safety system or a portion thereof can be removably attached to the drone 100.

Figure 23:
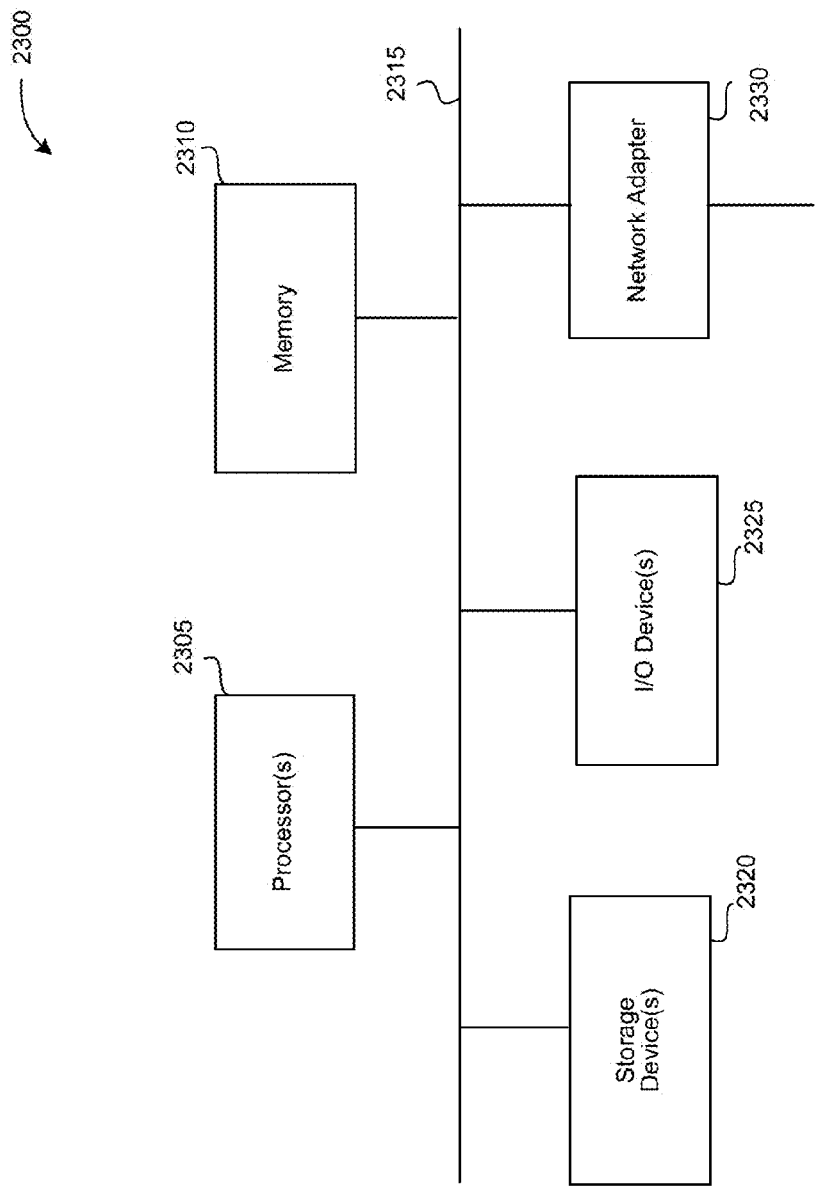
FIG. 23 is a block diagram of a computer system as may be used to implement features of the disclosed embodiments.

FIG. 23 is a block diagram of a computer system as may be used to implement features of the disclosed embodiments. The computing system 2300 may be used to implement any of the entities, components or services depicted in the examples of the foregoing figures (and any other components and/or modules described in this specification). The computing system 2300 may include one or more central processing units ("processors") 2305, memory 2310, input/output devices 2325 (e.g., keyboard and pointing devices, display devices), storage devices 2320 (e.g., disk drives), and network adapters 2330 (e.g., network interfaces) that are connected to an interconnect 2315. The interconnect 2315 is illustrated as an abstraction that represents any one or more separate physical buses, point to point connections, or both connected by appropriate bridges, adapters, or controllers. The interconnect 2315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 2310 and storage devices 2320 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 2310 can be implemented as software and/or firmware to program the processor(s) 2305 to carry out actions described above. In some embodiments, such software or firmware may be initially provided to the processing system 2300 by downloading it from a remote system through the computing system 2300 (e.g., via network adapter 2330).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A drone comprising:
    a lift mechanism configured to lift and propel the drone;
    an error detection circuit configured to:
        detect an error in operation of the drone, the error indicating a failure of the drone, the failure including a failure in all or a subset of motors of the lift mechanism, and
        upon detecting the error, send a trigger event;
    a parachute securely attached to the drone and configured to slow a decent of the drone when deployed;
    a parachute deployment mechanism configured to release the parachute in response to the trigger event, or in response to another trigger event generated in response to a command from a base unit operated by a remote user; and
    a cut-off circuit configured to control the lift mechanism in response to the trigger event, wherein the cut-off circuit is configured to control the lift mechanism by disabling the lift mechanism.

2. The drone of claim 1 further comprising:
    a first power source configured to power the lift mechanism.

3. The drone of claim 1 further comprising:
    a second power source configured to power the error detection circuit.

4. The drone of claim 3, wherein the second power source is further configured to power the parachute deployment mechanism.

5. The drone of claim 1, wherein the parachute is securely attached to the drone by being permanently attached to the drone.

6. The drone of claim 1, wherein the parachute is securely attached to the drone by being interchangeably affixed to the drone.

7. The drone of claim 1 further comprising:
a navigation circuit configured to navigate the drone from a first location to a second location.

8. The drone of claim 7, wherein the first location is a present location of the drone.

9. The drone of claim 1 further comprising:
a video system configured to capture an image from the drone; and
a communication system configured to transmit the image to the remote user.

10. The drone of claim 1 further comprising:
a communication system configured to communicate with the base unit operated by the remote user.

11. The drone of claim 1 further comprising:
a parachute controller configured to steer the drone with the parachute deployed and by steering the parachute.

12. The drone of claim 11, wherein the parachute controller is configured to steer the drone autonomously using one or more of multiple sensors on board the drone and a steering logic of the parachute controller.

13. The drone of claim 11, wherein the parachute controller is configured to steer the drone based on a command received from the remote user from the base unit.

14. The drone of claim 11, wherein the parachute controller is configured to steer the drone to a specified location based on a video feed received from a video camera installed onboard the drone.

15. The drone of claim 1, wherein the error detection circuit is configured to detect the error when there is a loss of heartbeat signal from a flight controller of the drone.

16. The drone of claim 1, wherein the error detection circuit is configured to detect the error when there is a geo fence breach by the drone.

17. The drone of claim 1, wherein the error detection circuit is configured to detect the error when a tilt of the drone exceeds a specified value.

18. The drone of claim 1, wherein the error detection circuit is configured to detect the error when a tilt of the drone exceeds a specified value for a specified duration.

19. The drone of claim 1, wherein the error detection circuit is configured to detect the error when a speed at which the drone is descending exceeds a specified value.

20. The drone of claim 1, wherein the error detection circuit is configured to detect the error when an ability to communicate with a control station is lost.

21. The drone of claim 1, wherein the error detection circuit is configured to detect the error when there is a power loss to the drone or a charge in any of multiple power sources of the drone is below a specified threshold.

22. The drone of claim 1, wherein the error detection circuit is configured to detect the error when there is a collision between the drone and another object.

23. The drone of claim 1, wherein the error detection circuit is configured to detect the error when there is a loss of flight control.

24. The drone of claim 1, wherein the parachute is steerable.

25. The drone of claim 1, wherein the parachute deployment mechanism is configured to release the parachute without requiring power from a power source that supplies power to the drone.

26. The drone of claim 1 further comprising:
a communication system, wherein the communication system includes a two way radio, configured to communicate a status of the error detection circuit to the remote user.

27. The drone of claim 1, wherein the cut-off circuit is configured to include an onboard "kill" switch that is configured to control the lift mechanism in response to the trigger event.

28. The drone of claim 27, wherein the onboard kill switch is powered by an independent power source.

29. The drone of claim 1, wherein the cut-off circuit is configured to disable the lift mechanism by substituting a throttle signal to the lift mechanism from a flight controller with a zero throttle signal.

30. The drone of claim 1, wherein the cut-off circuit is configured to disable the lift mechanism by breaking an electrical connection between a power source of the drone and the lift mechanism.

31. The drone of claim 1, wherein the cut-off circuit is configured to disable the lift mechanism by breaking an electrical connection between a speed controller and a motor of the lift mechanism.

32. The drone of claim 1, wherein the cut-off circuit is configured to disable the lift mechanism by disconnecting a power source of the drone using a spring loaded mechanical switch.

33. The drone of claim 1, wherein the cut-off circuit is configured to disable the lift mechanism by failing a subset of multiple motors of the lift mechanism.

34. The drone of claim 33 further comprising:
a flight controller, wherein the flight controller is configured to:
readjust a load on a remaining of the motors that are not failed, and
land the drone using the remaining of the motors.

35. The drone of claim 1, wherein the cut-off circuit is configured to control the lift mechanism before the parachute is deployed.

36. The drone of claim 1, wherein the parachute deployment mechanism is configured to receive the trigger event from an onboard "kill" switch that is activated from the base unit by the remote user.

37. The drone of claim 1 further comprising:
an airbag deployment module to deploy an airbag in response to a specified trigger event, the specified trigger event generated by the remote user or automatically by the airbag deployment module based on an indication that an impact of the drone upon landing exceeds a specified threshold.

38. The drone of claim 1 further comprising:
a passive safety system.

39. The drone of claim 38, wherein the passive safety system is a layer of padding underneath the drone.

40. The drone of claim 39, wherein the passive safety system is made of foam.

41. The drone of claim 39, wherein the passive safety system is incorporated in an airframe of the drone, and wherein the passive safety system or a portion thereof is removably attached to the drone.

42. The drone of claim 39, wherein the padding has a thickness that is proportional to a center of gravity of the drone.

43. The drone of claim 39, wherein the padding is an inflatable air cushion that is permanently deployed.

44. The drone of claim 39, wherein the padding is an inflatable air cushion that is deployed in response to a specified trigger event.

45. A method of deploying a parachute of a drone, the method comprising:
   detecting an error in operation of the drone while the drone is in flight;
   determining whether the error is of a type that requires a deployment of the parachute, the error indicating a failure of the drone, the failure including a failure in all or a subset of motors of a lift mechanism of the drone; and
   responsive to the determination that the error is of the type that requires the parachute to be deployed,
      controlling the lift mechanism by disabling the lift mechanism, the disabling including sending a zero throttle signal to the lift mechanism that renders the drone unflyable, and
      sending a signal to a parachute deployment mechanism on the drone to deploy the parachute.

46. The method of claim 45 further comprising:
   steering the parachute to navigate the drone to a specified location.

47. A base unit for deploying a parachute on a drone, comprising:
   a communication system configured to send and receive instructions from the drone;
   an auto deployment switch configured to enable or disable auto deployment of the parachute on the drone in response to a failure of the drone, the failure including a failure in all or a subset of motors of a lift mechanism of the drone;
   an arming switch configured to enable or disable manual deployment of the parachute from the base unit; and
   a deploy switch configured to send a signal to an onboard "kill" switch on the drone that, when activated, causes the drone to:
      control the lift mechanism by disabling the lift mechanism, the disabling including stopping one or more motors of the lift mechanism, and
      deploy the parachute after controlling the lift mechanism, wherein the deploy switch sends the signal if the arming switch is enabled and when the deploy switch is activated by a user.

48. A method of deploying a parachute of a drone, the method comprising:
   receiving a command at the drone from a base unit operated by a user for deploying the parachute, wherein the command is received from the base unit in response to the user activating a deploy switch at the base unit, and wherein the base unit and the drone communicate via a satellite or radio signals; and
   activating an onboard "kill" switch of the drone in response to receiving the command, the "kill" switch configured to:
      control a lift mechanism of the drone by disabling the lift mechanism, the disabling including substituting a throttle signal to the lift mechanism with a zero throttle signal for terminating a flight of the drone, and
      send a signal to a parachute deployment mechanism on the drone to deploy the parachute after controlling the lift mechanism.

* * * * *